US009222285B1

(12) United States Patent
Ilislamloo et al.

(10) Patent No.: US 9,222,285 B1
(45) **Date of Patent: *Dec. 29, 2015**

(54) THEFT DETERRENT DEVICE AND METHOD OF USE

(71) Applicant: Perseus Micro Logic Corporation, Saratoga, CA (US)

(72) Inventors: Shahriar Ilislamloo, Saratoga, CA (US); Andisheh Sarabi, Pleasanton, CA (US)

(73) Assignee: PERSEUS MICRO LOGIC CORPORATION, Saratoga, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/555,497

(22) Filed: Nov. 26, 2014

Related U.S. Application Data

(60) Provisional application No. 62/032,499, filed on Aug. 1, 2014.

(51) Int. Cl.

| | |
|---|---|
| ***H04Q 9/00*** | (2006.01) |
| ***E05B 49/00*** | (2006.01) |
| ***E05B 73/00*** | (2006.01) |
| ***G07C 9/00*** | (2006.01) |

(52) U.S. Cl.
CPC ............. *E05B 49/00* (2013.01); *E05B 73/0082* (2013.01); *G07C 9/00007* (2013.01); *E05B 2073/0088* (2013.01)

(58) Field of Classification Search
CPC ........................ G08B 13/1409; G08B 13/1418
See application file for complete search history.

(56) References Cited

U.S. PATENT DOCUMENTS

| | | | | |
|---|---|---|---|---|
| 3,824,540 | A | 7/1974 | Smith, II | |
| 5,003,292 | A | 3/1991 | Harding et al. | |
| 5,034,723 | A * | 7/1991 | Maman | 340/568.2 |
| 5,351,507 | A | 10/1994 | Derman | |
| 5,525,965 | A | 6/1996 | Liebenthal | |
| 5,754,108 | A | 5/1998 | Ungarsohn | |
| 6,078,265 | A | 6/2000 | Bonder et al. | |
| 6,133,830 | A | 10/2000 | D'Angelo | |
| 6,150,940 | A | 11/2000 | Chapman | |
| 6,459,374 | B1 * | 10/2002 | Rand et al. | 340/568.2 |
| 6,536,815 | B1 | 3/2003 | Liroff | |
| 7,079,032 | B2 | 7/2006 | Merrem | |
| 7,135,971 | B2 | 11/2006 | Kim | |
| 7,362,227 | B2 * | 4/2008 | Kim | 340/571 |
| 7,710,266 | B2 | 5/2010 | Belden, Jr. | |
| 7,741,974 | B1 * | 6/2010 | Kuo | 340/686.6 |
| 7,936,267 | B2 * | 5/2011 | Pasma | 340/568.2 |
| 8,294,578 | B2 * | 10/2012 | Chang et al. | 340/568.2 |

(Continued)

*Primary Examiner* — Brian Zimmerman
*Assistant Examiner* — Sara Samson
(74) *Attorney, Agent, or Firm* — Sawyer Law Group, P.C.

(57) ABSTRACT

A portable theft deterrent device is disclosed. The theft deterrent device comprises a lock detection mechanism. The lock detection mechanism includes a plurality of connectors. The lock detection mechanism includes a first active circuit therein coupled to the plurality of connectors. When the lock detection mechanism is coupled to an electrical path via at least one connector of the plurality of connectors and if the first active circuit detects an interruption in electrical flow in the electrical path, the lock detection mechanism provides an alert. The theft deterrent device includes a monitoring key member. The monitoring key member includes a second active circuit therein that allows for wireless communication with the lock detection mechanism when detached therefrom. The monitoring key member is configured to receive the alert remotely.

30 Claims, 19 Drawing Sheets

(56) References Cited

U.S. PATENT DOCUMENTS

| | | | | |
|---|---|---|---|---|
| 8,378,821 | B2 * | 2/2013 | Edelstein et al. | 340/568.1 |
| 8,517,748 | B1 * | 8/2013 | Kelsch et al. | 439/188 |
| 8,659,426 | B2 | 2/2014 | Yunker | |
| 8,736,450 | B2 | 5/2014 | Brown | |
| 2003/0151510 | A1 * | 8/2003 | Quintana et al. | 340/568.2 |
| 2003/0206495 | A1 | 11/2003 | Kibiloski | |
| 2004/0074264 | A1 * | 4/2004 | Kung et al. | 70/58 |
| 2005/0073423 | A1 | 4/2005 | Kim | |
| 2008/0045069 | A1 | 2/2008 | Haren | |
| 2008/0297345 | A1 | 12/2008 | Chen | |
| 2008/0316309 | A1 * | 12/2008 | Roper | 348/143 |
| 2009/0033492 | A1 | 2/2009 | Rapp et al. | |
| 2009/0189765 | A1 * | 7/2009 | Lev et al. | 340/568.2 |
| 2011/0260867 | A1 | 10/2011 | McCracken et al. | |
| 2013/0194096 | A1 * | 8/2013 | Belden et al. | 340/568.4 |
| 2014/0035747 | A1 | 2/2014 | Ewen, III et al. | |
| 2014/0210622 | A1 | 7/2014 | Bailey | |
| 2014/0326027 | A1 * | 11/2014 | Avganim | 70/275 |

* cited by examiner

THEFT DETERRENT DEVICE AND METHOD OF USE

CROSS-REFERENCE TO RELATED APPLICATION

This application claims priority to U.S. Provisional Patent Application No. 62/032,499 by co-inventors Shahriar Ilislamloo and Andisheh Sarabi, on Aug. 1, 2014, entitled "Method and Apparatus for Protecting a Portable Device".

This application is related to U.S. patent application Ser. No. 14/555,521, filed on Nov. 26, 2014, entitled "THEFT DETERRENT DEVICE AND METHOD OF USE", which is incorporated herein by reference.

FIELD OF THE INVENTION

The present invention relates generally to protecting a device against tampering or theft and more particularly to theft deterrence for protecting a device against tampering or theft.

BACKGROUND OF THE INVENTION

Theft deterrent devices have become increasingly popular for protecting devices from intrusion. In large part, this is due to the variety and wide scope of applications offered for use by portable devices in addition to smaller form factors. Costly portable devices, such as electronics, are particularly vulnerable because they are transportable yet they often carry store users' private and sensitive information that if fallen into the wrong hands can have devastating effects, such as identity theft. On the other hand, the convenient portability of devices undesirably contributes to the ease of unwarranted intrusion, theft, or intentional and unintentional tampering. Anti-tampering or anti-deterrent techniques are therefore required.

Currently, theft and/or tampering-deterrent devices do not serve their purpose well. They tend to be ineffective in that they can be easily bypassed, inflexible in that their use is limited, and unreliable. They often fail to alert users of tampering and/or theft because simply stated, they lack adequate capability. For example, by the time the user is alerted of the loss of its device, the portable device (or object) has long been taken or already damaged.

Security-enhancement devices are generally best suited for a particular type of device and lack universal applicability in protecting different types of portable devices. Security devices that offer a suitable measure of protection tend to be large in size, unreliable, and often too inconvenient to be useful to the average individual.

Therefore, the need arises for a theft and tampering-deterrent device to protect a user's portable device (or object) from damage, tampering, and/or theft.

SUMMARY OF THE INVENTION

A portable theft deterrent device is disclosed. The theft deterrent device comprises a lock detection mechanism. The lock detection mechanism includes a plurality of connectors. The lock detection mechanism includes a first active circuit therein coupled to the plurality of connectors. When the lock detection mechanism is coupled to an electrical path via at least one connector of the plurality of connectors and if the first active circuit detects an interruption in electrical flow in the electrical path, the lock detection mechanism provides an alert. The theft deterrent device includes a monitoring key member. The monitoring key member includes a second active circuit therein that allows for wireless communication with the lock detection mechanism when detached therefrom. The monitoring key member is configured to receive the alert remotely.

These and other objects and advantages of a system and method in accordance with the present invention will become apparent to those skilled in the art after having read the following detailed description of the various embodiments illustrated in the several figures of the drawing.

DETAILED DESCRIPTION

Figure 1:
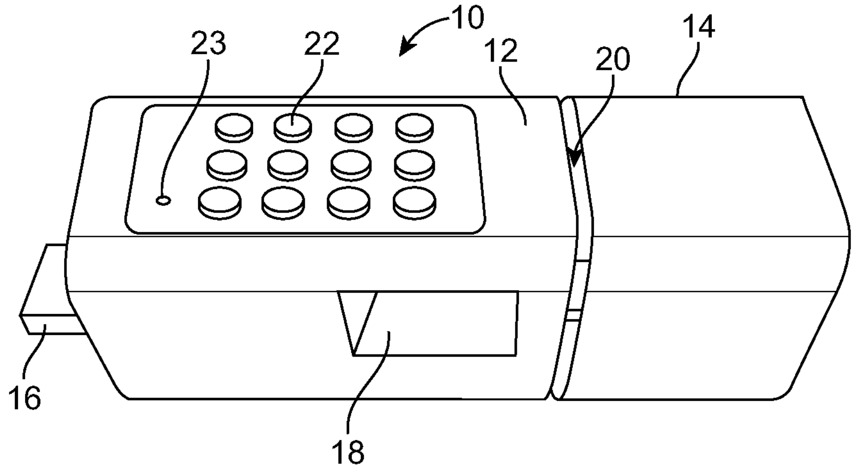
FIG. 1 shows an anti-theft/tampering device 10, in accordance with an embodiment.

The present invention relates generally to protecting a user object against tampering or theft and more particularly to protecting a portable user object against tampering or theft. A portable user object in one embodiment could comprise an electronic device such as laptop, smart phone, digital camera, hand held television, recorder, tablet, phablet or the like. In another embodiment the portable user object could comprise any object with an opening such as luggage, briefcase and the like. In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention. It should be noted that the figures discussed herein are not drawn to scale and thicknesses of lines are not indicative of actual sizes.

A deterrent device, shown, discussed and contemplated using the various illustrative embodiments of the invention, can be classified by the following: the manner in which such a device is anchored; the type of object such a device protects; the type of connections between such a device and the object and the method of alerting a user of such a device of undesirable intrusion, such as theft tampering or theft attempts.

Various embodiments are generally made of two distinct physical parts, an activity-deterrent notification lock and a user monitor key that when physically and communicatively coupled together, effectively protect a host of portable devices (or objects) using an anchoring technique.

The deterrent devices of the various embodiments protect a user's portable device against tampering or theft by use of a deterrent notification lock and in some embodiments, a user monitoring key. The deterrent notification lock can operate work as a standalone unit or in conjunction with the user monitoring key, which notifies the user of the status of the device being protected. The deterrent notification lock is either directly or virtually secured to the device being protected. This lock is also separately or in conjunction with securing the device, anchored to a relatively unmovable object to anchor the device being protected to a relatively unmovable object. The anchoring can be performed virtually, in some embodiments.

Once the deterrent lock is anchored and the device being protected is secured by the deterrent notification lock, the user is notified generally of the change-in-location (or lack thereof) or the change-in-status of the device via the user monitoring key and/or locally by its own alert system. Further, the user can be alerted in the event of the strength of the communication signal between lock and key becoming degraded. The degradation can occur due to distance between the lock and the key or low battery/power or any other interference such as noise. The unintentional leaving of the device behind will trigger the notification due to the increase in the distance between the lock and the key. The user can also be notified of any tampering of the device being protected. In the case where the deterrent lock is anchored and the device being protected is secured through the deterrent notification lock without the use of the user monitoring key, the tampering and deterrence are still reported locally.

A user can further be notified of tampering and attempted theft through a remote connection, such as through the Internet.

In some embodiments, the deterrent notification lock operates as a standalone unit, without the user monitoring key. In such embodiments, the user is alerted of tampering attempts by a sound, such as a beep, horn or the like when in local vicinity of the device but at the price of lowered security relative to the above scenario. In other embodiments, any malfunction of the lock, either through failure or outside tampering, is detected by the user monitoring key while in the case presented above, the user monitoring key cannot necessarily detect failure or tampering.

In some embodiments, instead of a dedicated device, such as the user monitoring key, a general-purpose device may be employed to monitor the device being protected, such as a mobile or smart phone. In this case, the phone communicates using standard wireless/wired communication means, such as Bluetooth or a cable connection.

Portable devices that are electrically-powered (active devices), such as without limitation, computers and phones, in addition to non-powered devices (passive devices), such as without limitation, luggage and briefcases, are effectively, reliably, and flexibly secured using the anchoring technique of the various methods and embodiments.

Alternatively, a number of portable devices that are physically and/or electrically connected to each other are secured.

Use of the deterrent device, in certain configurations and in conjunction with other devices, expands beyond the scope of security and protection measures. As an example, electrically-powered devices, such as but not limited to, smart phones are not only protected but can also be charged using the deterrent device, according to various embodiments and associated methods.

Furthermore, in an illustrated embodiment, shown and discussed below, the user monitoring key securely communicates and remotely interfaces with the lock. The user monitoring key can remotely interact with the user through a network. The network could be either a public or private such as the worldwide web. For example, an alarm, an indicator or any other suitable means of alerting can be used by the key and the lock to inform those in close proximity and alert a remotely-located user of an undesirable activity.

In accordance with methods and apparatus of various embodiments, to prevent tampering, the user is notified of disturbance to the object being protected, i.e. the protected device. The same holds true for disturbance to the site in which the object is being remotely protected.

In alternate embodiments, rather than protection and security, certain environmental parameters may be monitored by the deterrent device, parameters such as temperature, humidity, fire or other types of factors-of-interest that are appropriate for tracking and monitoring. Results of such monitoring can be reported to an externally situated device, such as a smart phone, computer, or any other remotely or locally-situated monitor.

Other exemplary applications of the deterrent device are protection of peripheral devices such as mouse or keypad of a corresponding laptop or the laptop itself, whether by (cable) wire or wirelessly. Undesired changes to protected devices, such as tampering by un-plugging the mouse or keyboard or typing on the keyboard or attaching a new peripheral device or the movement of the mouse, is detected through wire or wireless transmission and can be reported accordingly.

Out-of-range detection is yet another application of embodiments of the deterrent device. Out-of-range detection is done by loss of communication or reduction of signal strength below a tolerable level between the key and the lock, or malfunctioning of either one. Alternatively, a threshold may be programmably (or statically) set below which communication between the lock and the key is considered effectively lost. The inability of the key and the lock to properly communicate with each other is typically reported to the user by the key, and in some embodiments, by the lock. The inability of the key and the lock to properly communicate with each other can be due to low signal strength or battery outage or the distance between the lock and the key or some noise interference or a combination of the above. Since the tampering with anchoring and securing are detected by monitoring the electrical flow in the corresponding electrical paths, any power outage in these paths will be treated as a failure. In a securing electrical path, in the case of the device being protected having low battery voltage or out of power, this condition will be treated as tampering with the securing electrical path and it will be notified remotely and locally. In an anchoring electrical path, in the case of the lock having low battery voltage or being out of power, this condition will similarly be treated as tampering with the anchoring electrical path. However, the user monitor key will be alerted due to reporting of low battery voltage or the interruption of periodical communication signals between the lock and the key due to power outage in the lock.

In some embodiments, the relative distance between the lock and the key is monitored. As the distance grows, the user is notified.

The deterrent device is an effective technique for non-hostile situations as well. By way of an example, where the user has secured his/her laptop and for some reason, leaves the location of the laptop but forgets to take the laptop, the key can be used to alert the user upon the user going beyond the range tolerated by the communication capabilities of the lock and the key. The user is therefore given a chance to go back and pick up the laptop before getting too far away from it.

It should be noted that the examples provided herein, such as those above, are merely some of many others and needless to say too numerous to list. To describe the features of systems and methods in accordance with the present invention in more detail refer now to the following description in conjunction with the accompanying Figures. Referring now to FIG. 1, deterrent device 10 is shown in accordance with an embodiment. Device 10 is shown to include two parts, a (user) monitoring key 14 and deterrent notification lock 12. The lock 12 is shown to include a tampering-resistant opening 18, a lock-to-device connector 16, an indicator 23, and a communication pad 22. In one embodiment, the key 14 is physically attached to the lock 12 through a lock-to-key connection 20.

It is understood that while the device 10 is shown in the figures of this patent document to have generally a rectangular shape, other suitable shapes are contemplated. In an embodiment, the device 10 is made generally of plastic but can be made of any other suitable material.

Lock communication pad 22 and indicator 23 are shown situated on a top surface of the lock 12; however, other suitable areas of the lock 12 may be used to house the indicator 23 and pad 22. The housing can also include a LCD or other displays of communication with the user or other input devices such as a touchpad. A tampering-resistant opening 18 is shown to extend from a longest side of the lock 12 through the interior of the lock through to an opposite side thereof. Again, other suitable locations for the opening 18 are contemplated.

A security-bound connector 16 is shown protruding from a side of the lock 12 for establishing physical connection 20 with cable and/or a device, such as a phone charger. While shown to appear as a space between the lock 12 and the key 14, the connection 20 is nearly non-existent, with the side of each of the lock and the key facing each other are flush against one another. As shown in subsequent figures, each of the lock 12 and key 14 have a connector protruding therefrom that are used to physically connect one to the other and situated at a location within the connection 20.

During operation of the device 10, when the lock 12 and the key 14 are connected 20, the lock 12 electrically synchronizes with the key 14. Synchronization may include handshaking between the lock and the key and is further described below relative to flow chart figures.

Upon completion of synchronization, the lock 12 and the key 14 can begin to effectively communicate with one another even when they are not physically coupled. Upon completion of the lock-key synchronization, the key 14 may be physically re-located away from the lock 12 up to distances that are within the signal-range of the device 10. Upon the detection of an intrusion of the protected device by the lock 12, the lock 12 reports the intrusion to the key 14 and the key 14 alerts the user. Anchoring serves to physically fix the lock 12, within the confines of an anchoring cable, to a non-readily movable object, various examples of which are provided below and shown in subsequent figures.

Alternatively, the lock 12 may be a stand-alone device, not accompanied by the key 14. In this embodiment, the lock 12 is physically connected to the portable device being protected, through its connector and connected, via another connector, to a connector of a laptop, and used to locally alert a user. That is, upon unauthorized disconnection of the lock 12 from the device being protected, the lock 12 announces the disconnection, via a sound alarm or other desirable reporting means.

Figure 2:
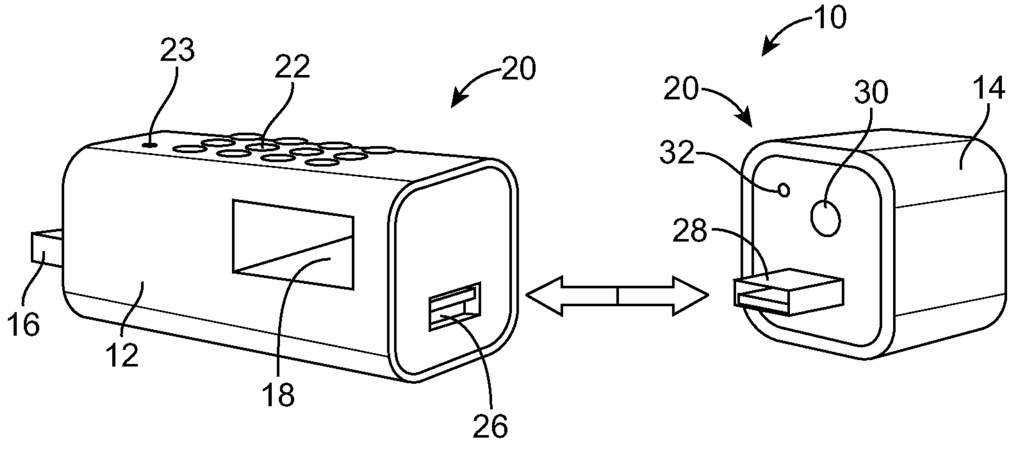
FIG. 2 shows further details of the device 10 with the key 14 shown detached from the lock 12.

FIG. 2 shows further details of the device 10, in accordance with an embodiment. In FIG. 2, the key 14 and the lock 12 are shown physically detached from one another. The lock 12 is shown to include an anchor-bound connector 26, in addition to the lock indicator 23. The key 14 is shown to have a key connector 28, a key communication pad 30 and a key indicator 32. When physically coupled, connectors 26 and 28 form the connection 20 (shown in FIG. 1.)

Through the key communication pad 30, the user communicates with the key and effectively controls its operation. For example, operations can be initiated by the user by use of the key communication pad 30. In an embodiment, the lock 12 receives start-of-operation and end-of-operation commands from the key 14. These commands cause, for example, the start of deterring tampering and later the ending of deterring tampering of the electronic device. In another embodiment the key communication pad may have more than one key or implemented by a touchpad or LCD.

The lock communication pad 22 is generally utilized by the user to communicate initiation of operations or relaying of various attributes. A contemplated use of the communication pad 22 is for password-protected operations. When the user enters a password via the communication pad 22, signaling the beginning of a particular operation, the lock is triggered to start a particular operation. As discussed above, the key communication pad 30 is utilized in a similar manner by the user. Other applications of the communication pad 22 are contemplated according to design choices by a designer of the device 10.

In accordance with various embodiments, the communication pad 22 may be realized through a push-button, touchpad, a keypad, or other mechanisms that assist the user in notifying the device 10 of various information, such as parameters and passwords. An illustrative embodiment of the communication pad 22, in the form of a keypad, is shown in FIGS. 1 and 2 and those to follow.

In an embodiment, key indicator 32 is implemented in the form of a light and flashes or lights up with one or more distinct colors to indicate the presence of pre-determined information or in response to an alert or an alarm, as detected by the lock 12.

The opening 18 is essentially a hole or void extending through the two longer sides of the device 12 although, as earlier noted, in other embodiments, the opening 18 may extend through the shorter two sides of the device 12. Alternatively, the opening 18 may protrude externally from a side of the lock 12. Yet alternatively, the opening may be the shape of a square or rectangle and extend vertically between the top and bottom surfaces of the device 10 and horizontally between the two sides of the device with a minimum size of the opening 18 being desirably large enough to allow a connecting cable to pass through it yet small enough to prevent the object being protected to pass therethrough.

The connectors 26 and 28 can physically mate through means other than those shown or described herein, based on, for example, design choices. Without loss of generality, in an embodiment, the connectors 26 and 28 are Universal Serial Bus (USB) connectors. The number of connectors and their types can be customized toward a particular application such as having a RS232 family or circular phone connectors family or different type of USB Adaptors.

In some embodiments, the lock 12 has a connector on either side, as shown in FIG. 1, one of which—connector 16—allows the lock to monitor or protect a portable device/object. However, the lock 12 is hardly limited to protecting only one device and can rather, with the use of more than one connector on one side, reliably protect/monitor more than one device or anchored by more than one object.

Figure 3:
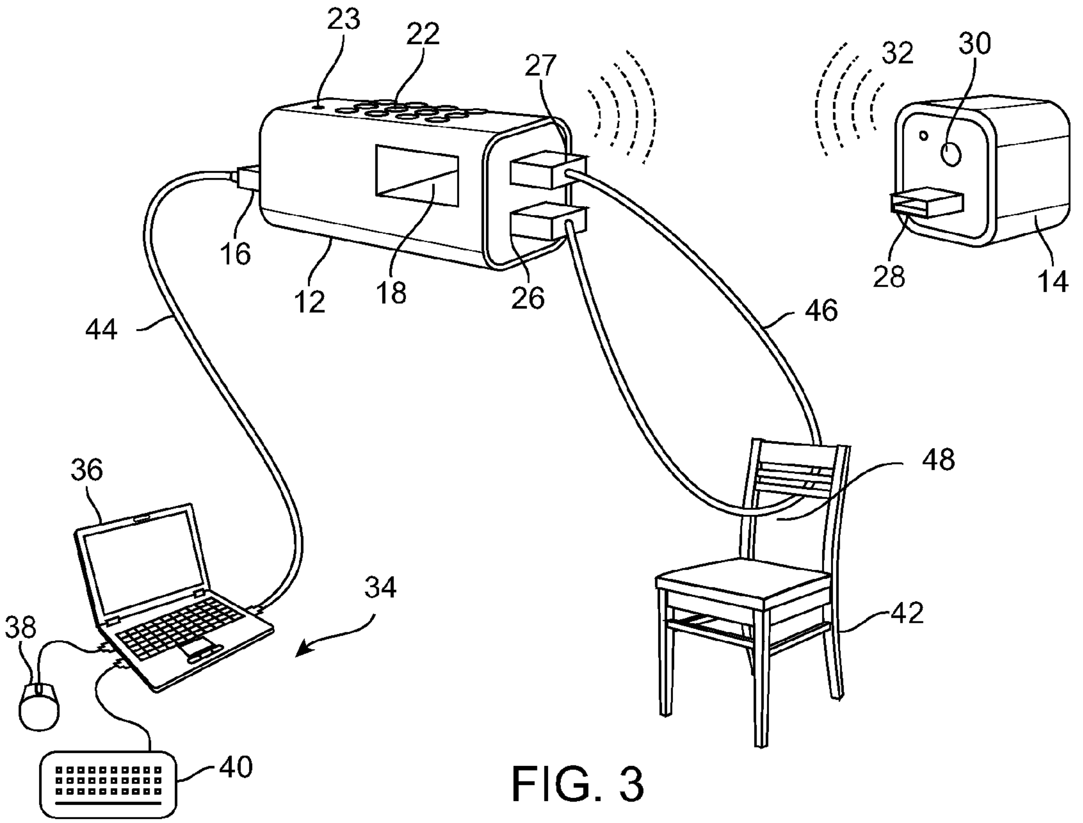
FIG. 3 shows one of numerous applications of the device 10, in accordance with a method and embodiment.

FIG. 3 shows one of numerous applications of the device 10, in accordance with a method and embodiment. In this particular example, a laptop 36, mouse 38, and/or keyboard 40 are devices under protection.

The lock 12 is shown anchored, through connectors 26 and 27, to an example of an anchoring object, i.e. the chair 42, thereby securing the three portable devices, the mouse 38, the laptop 36, and the keyboard 40. More specifically, the keyboard 40 and the mouse 38 are shown connected to the laptop 36 and the laptop 36 is shown connected to the lock 12 through the connector 16. By virtue of their connection to the laptop 36, the keyboard 40 and the mouse 38 are monitored/protected by the lock 12 because the laptop 36 can communicate with the lock 12 and report thereto, the presence or absence of the three devices to the lock 12. It is noted that an effective anchoring object is one that is not readily removed or picked up. In fact, the more securely an anchoring object is secured, such as to the floor or ground, the increased effectiveness of the device 10 in protecting a portable object.

In FIG. 3, the chair 42 is used as an anchoring object, as it is in a fixed or stationary position (affixed to the floor) and cannot be easily moved. The laptop 36, mouse 38 and/or keyboard 40, on the other hand, are portable therefore requiring protection. The security of the laptop/mouse/keyboard is monitored by the device 10 and if the device 10 detects an undesirable intrusion, the device 10 remotely reports the same, through use of the lock 12, to the key 14.

The exemplary anchoring object of FIG. 3, i.e. chair 42, need not be permanently or fully stationary and instead only need be a structure that is not easily moveable. The anchoring object also has a shape allowing for the passage of a physical cable through a part of it, such as the opening 48, in FIG. 3. Obviously, the less portable an anchoring object, the greater the effectiveness of protecting a device.

In FIG. 3, the lock 12 is shown physically anchored to the chair 42 through an anchoring cable 46. The cable 46 is generally flexible allowing it to loop through the area pointed to by the pointer 48, in FIG. 3. As shown in FIG. 3, the cable 46 connects at one of its ends to one of the connectors (connector 27) of the lock 12, then it is looped through the opening 48 and then connected to another connector (connector 26) of the lock 12 therefore forming a physical loop from and to the lock 12 through the area pointed by pointer 48. Analogously, an electrical loop also forms as a result of the physical loop.

That is, in the embodiment of FIG. 3, the lock 12 is shown to have two connectors, connectors 26 and 27. Connector 26 physically connects to one end of the cable 46 while an opposite end of the cable 46 physically connects to the connector 27 with this physical connection forming an electrical closed loop from and to the electrical circuitry within the lock 12. Namely, the flow of electrical current is continuous when the foregoing physical loop is formed and when the physical connection, i.e. the loop, is disrupted, the flow of current stops. It is through monitoring of this current flow in conjunction with the current continuing to flow through the internal circuitry of the lock 12 and the electrical path from cable 44 to the laptop 36, that the lock 12 detects tampering/intrusion. In another embodiment, the cable 44 can be eliminated by connecting the lock 12 directly to the laptop 36 via connector 16.

It is noteworthy to say that which end of the cable 46 connects with which connector of the connectors 26 and connector 27 is irrelevant. In fact, such as shown in the embodiment of FIG. 3, the lock 12 may have more than two connectors, connectors 26 and 27, used for securing more than one device, such as the combination of the laptop/mouse/keyboard. In other embodiments, the lock 12 employs connectors 26 and 27 to anchor to more than one anchoring object and not just the chair 42. For instance, two chairs can serve as anchoring objects. As a matter of convenience, the connectors 26 and 27 are shown to be the same type of connectors, in FIG. 3, but they need not be. It should, however, be possible to physically mate the connectors 26 and 27 to either end of the cable 46.

In yet other embodiments, the laptop/mouse/keyboard of FIG. 3 are secured in a cascaded manner. For example, the mouse 36 and the keyboard 40 are secured by the laptop 36; a second laptop (not shown) may also be secured by the laptop 36 and securing its own set of keyboard and mouse (not shown).

Alternatively, the laptop can be monitored for any contact or typing. For example, if the laptop is being monitored and an unauthorized individual starts typing, for example, a password to try to gain access to the laptop, the device 10 can detect the same and report it to the user through the key. In an embodiment, the laptop 36 and the lock 12 communicate through their respective connectors (or "ports") and a cable. Alternatively, the laptop 36 and the lock 12 communicate together wirelessly, i.e. Bluetooth, or any other suitable means.

In an alternative embodiment, detection of undesirable activity is performed by execution of specialized software/firmware that is installed onto a laptop. In this instant example, any changes to the connectors or the keyboard of the laptop 36 are detected by the execution of the installed software on the laptop. The detected intrusion information is then communicated to the lock 12, by the software/firmware of the laptop 36 and then passed on to the key 14 by the lock 12. The user accordingly, becomes aware of the tampering. This tampering can be communicated to lock 12 via the securing cable 44 or wirelessly via Bluetooth and/or Wi-Fi or other wireless means.

In the manner described above and shown in FIG. 3, the lock 12 is physically and electrically anchored to the chair 42. Physical anchoring is described above. Electrical anchoring is done by connecting the cable 46, at one of its ends, to the connector 26 and pulling the cable 46 through the area pointed to by the pointer 48 to connect to the connector 27. In this manner, assuming the lock 12 is properly operating, the relevant part of the detection circuit (not shown in FIG. 3) of the lock 12 is 'closed' because current flows through the cable 46. It is noted that the cable 46 need not necessarily loop through the area pointed to by the pointer 48 and rather merely requires some kind of structure through which it can physically loop coming out to connect back with the lock 12. One way to describe the loop is as follows. An anchoring cable employed for forming the loop travels through a location of the anchoring object that is essentially an opening or a pole extending between top and bottom surfaces such that the cable loop is smaller than the perimeter of the top and bottom surfaces to prevent the anchoring cable to travel passed the top and bottom surfaces. In the case of the pole, the cable wraps around the pole and in the case of the opening, which is a part of the anchoring object, the cable passes through the opening. In both examples of the pole and the opening, the cable connects to the lock at one of its ends while at another one of its ends, it also connects to the lock but through a connector that is distinct from the connector used to connect the one end of the cable to the lock. Alternatively, other configurations of the opening and cable for forming a loop are discussed and shown below. It is noted that the anchoring strength of the anchoring object is generally based on the permanency (ability to remain unmovable) of the anchoring object as well as the sturdiness of the space (or "opening") of the anchoring object.

Upon tampering or removal of the laptop 36, such as cutting of the cable 44, this electrical path 'opens'. An 'open' connection results in the detection circuit of the lock 12 detecting the absence of current flow. To this end, the lock 12 senses an electrical disconnection of the path that is formed by the cable 44 and remotely reports this disconnection to the key 14. An exemplary reporting technique/mechanism may be setting off of a sound alarm by the lock 12 thereby activating the indicator 23. Another example is the key setting off a sound alarm and activating the indicator 32. The key 14 may report tampering to the user by any other suitable means, such as, without limitation, vibration.

The laptop 36 is not secured until the device protection via cable 44 physically links the laptop 36, through the connector 16, to form an electrical path between the lock 12 and the laptop 36, much like the anchoring object, in that current flows through the cable 44 and back to the lock 12 where the lock's detection circuitry detects interruption of current flow. The cable 44 can be eliminated if connector 16 is connected directly to laptop 36. The mouse 38 and/or keyboard 40 may be similarly secured because tampering of the ports of the laptop 36 is detected by the lock 12.

As earlier mentioned, any other device coupled to the connectors of the laptop 36 can be protected. Further and as previously mentioned, the lock 12 can alert the key 14 of tampering/theft through wireless communication. An example of wireless communication is in accordance with protocol defined by the industry-recognized standard, Zigbee.

The key 14 and the lock 12 are each capable of communicating with a user personal device wirelessly or otherwise. For instance and without limitation, a user personal device may communicate wirelessly with the key and/or the lock, through Bluetooth, or through a computer to which the key or lock are physically or remotely coupled.

The electrical path is interrupted if any of the following occur in the example of FIG. 3: 1) the connection of the cable 44 to the connector 16 is removed; 2) the connection of the cable 44 to the laptop 34 is removed; 3) the cable 44 is cut between laptop 34 and the connector 16; 4) the connection of the cable 46 to either of the connectors 26 and 27 is removed; or 5) the cable 46 is cut between the connectors 26 and 27.

In various embodiments, notification of an electrical path interruption, as well as tampering of the device being protected is stored in an Electrically Erasable Programmable Read-Only Memory (EEPROM), which is physically located inside of the lock 12. In the event, the lock is out of power, the user has sufficient knowledge of all events that preceded the power outage when power is restored later.

The operation described herein regarding the embodiment of FIG. 2, except communication with the key 14, applies to the embodiment of FIG. 3.

Figure 4:
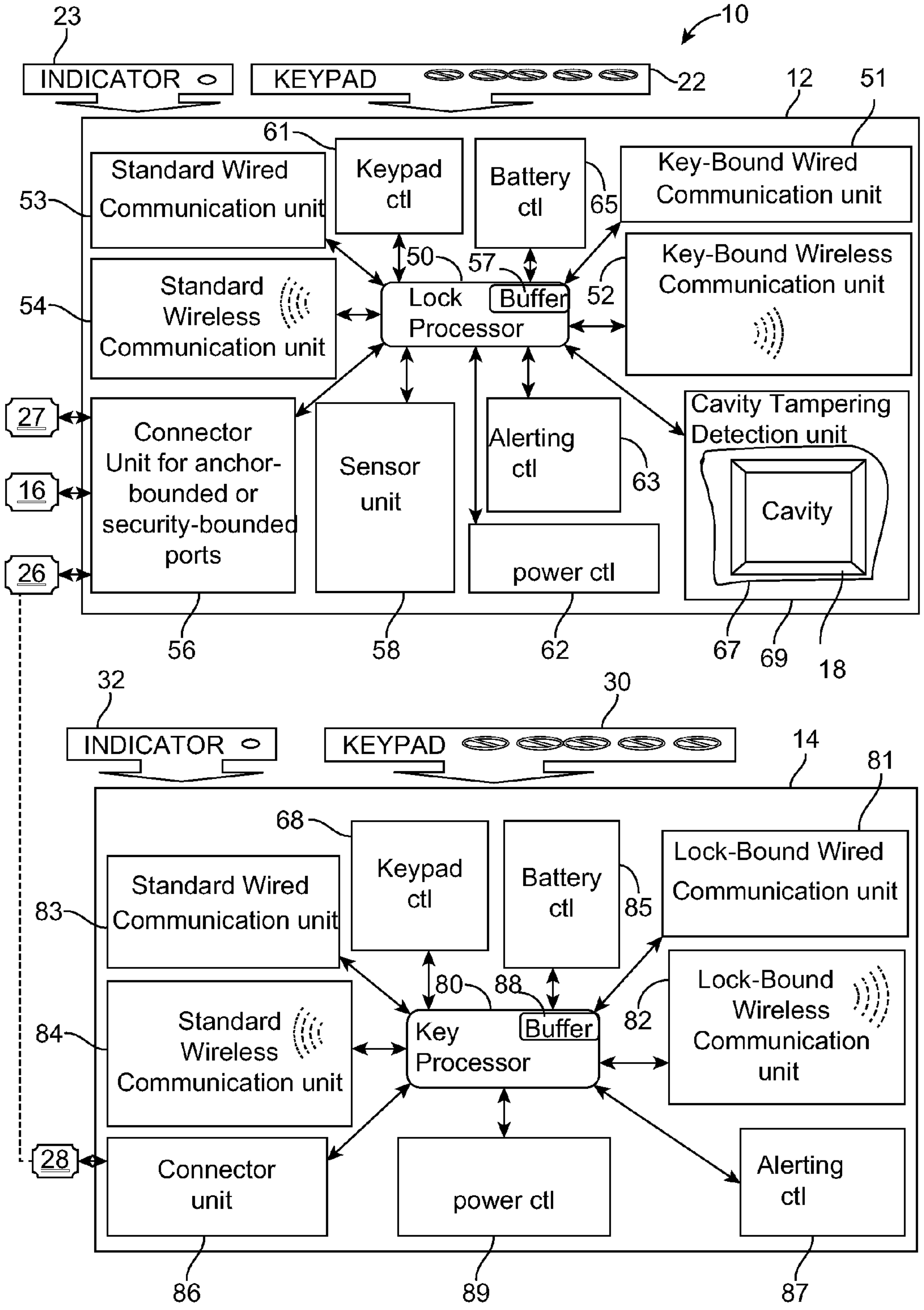
FIG. 4 shows, in conceptual form, a high-level block diagram of relevant portions of the internal structures of the lock 12 and key 14, in accordance with an embodiment.

FIG. 4 shows in conceptual form, a high-level block diagram of relevant internal portions of the lock 12 and key 14, in accordance with an embodiment. The lock 12 is shown to include lock communication pad 22, lock indicator 23, lock standard wired communication unit 53, lock keypad control block 61, lock battery control block 65, key-bound wired communication unit 51, lock processor 50, key-bound wireless communication unit 52, opening tampering detection unit 69, lock alerting control unit 63, lock power control unit 62, lock sensor unit 58, lock connector unit 56, lock standard wireless communication unit 54, and connectors 16, 26 and 27. The lock processor 50 is shown to include a buffer 57 that is used by the processor 50 for storing data, discussed in further detail below.

An example of the unit 53 is a universal receiver/transmitter (UART/i2c) with others anticipated. An example of the unit 54 is Bluetooth or Wi-Fi with others anticipated. More specifically, the unit 54 is used by the lock 12 to communicate, by using Bluetooth or Wi-Fi, with the device being protected or a gateway to the Internet.

The key 14 is shown to optionally include the pad 30, the indicator 32, a key standard wired communication unit 83, a key standard wireless communication unit 84, a key processor 80, a key keypad control unit 68, a key battery control block 85, a lock-bound wired communication unit 81, a lock-bound wireless communication unit 82, key alerting control unit 87, a key power control unit 89, key connector unit 86, and key connector 28. The key processor 80 is shown to include a key buffer 88, which is used by the processor 80 to store data, discussed in further detail below.

The physical location of each of the structure/blocks shown in FIG. 4 are not indicative of their actual physical positions. For example, connector 16, while it can be, need not be located on the same side of the device 12 as the connectors 26 and 27.

The lock processor 50 is shown coupled to the units 53, 54, 56, 58, 62, 63, 69, 52, and 51, and serves as the master-mind for the lock 12. The processor 50 instructs the structures to which it is coupled to take actions, or not, and communicates information (or data) from one structure to another and other relevant functions.

The unit 56 is shown coupled to the connectors 16, 26 and 27. The detection unit 69 houses the opening 18 as well as the opening-tampering notification device 67 that is shown wrapped around the outside of all of the sides of the opening 18. The cable 46 of FIG. 3 is poked through the opening 18 in certain applications that provide the user with added convenience, such as that shown by the embodiment of FIG. 9. As earlier stated, the opening 18 is optional.

Information from the user is received, through the communication pad 22, by the lock communication pad control unit 61 and ultimately communicated to the processor 50. The lock battery control block 65 and power control unit 62 provide power to the electrical circuits of the lock 12. Lock alerting control unit 63 determines when to alert the user. An alert to the user may be in the form of a sound alarm or a visual alarm, such as a LED/LCD. In applications that require it, the control unit 62 determines when to start and when to stop charging an electronic device. It also provides power to the key 14 through connection 20.

The unit 54 enables the lock 12 to wirelessly communicate with an external device, such as a laptop. The block 51 processes communication that is transmitted or received through a physical connection with key 14 as opposed to wirelessly, whereas, the unit 52 does the same through wireless communication.

The unit 56 receives input from the outside through the connectors 16, 26, and 27 and passes on the received input to the processor 50 for processing. It also provides communication back to the outside from the processor 50.

In FIG. 4, the key 14 is shown to include structures analogous to those of the lock. The processor 80, analogous to processor 50, is the master-mind for the key 14.

Figure 5:
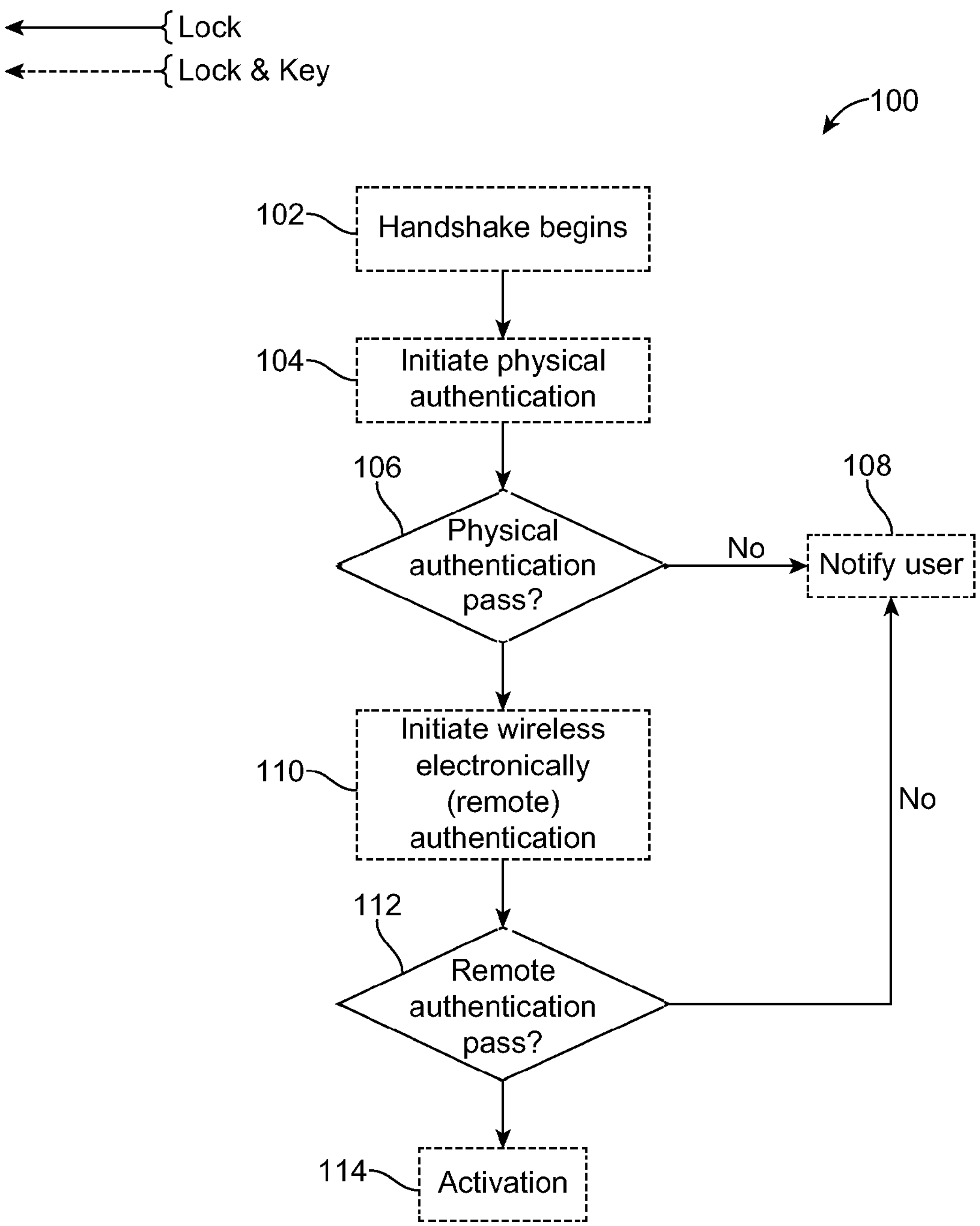
FIGS. 5 and 6 show a flow chart of some of the relevant steps performed by the lock and key for handshaking.
Figure 6:
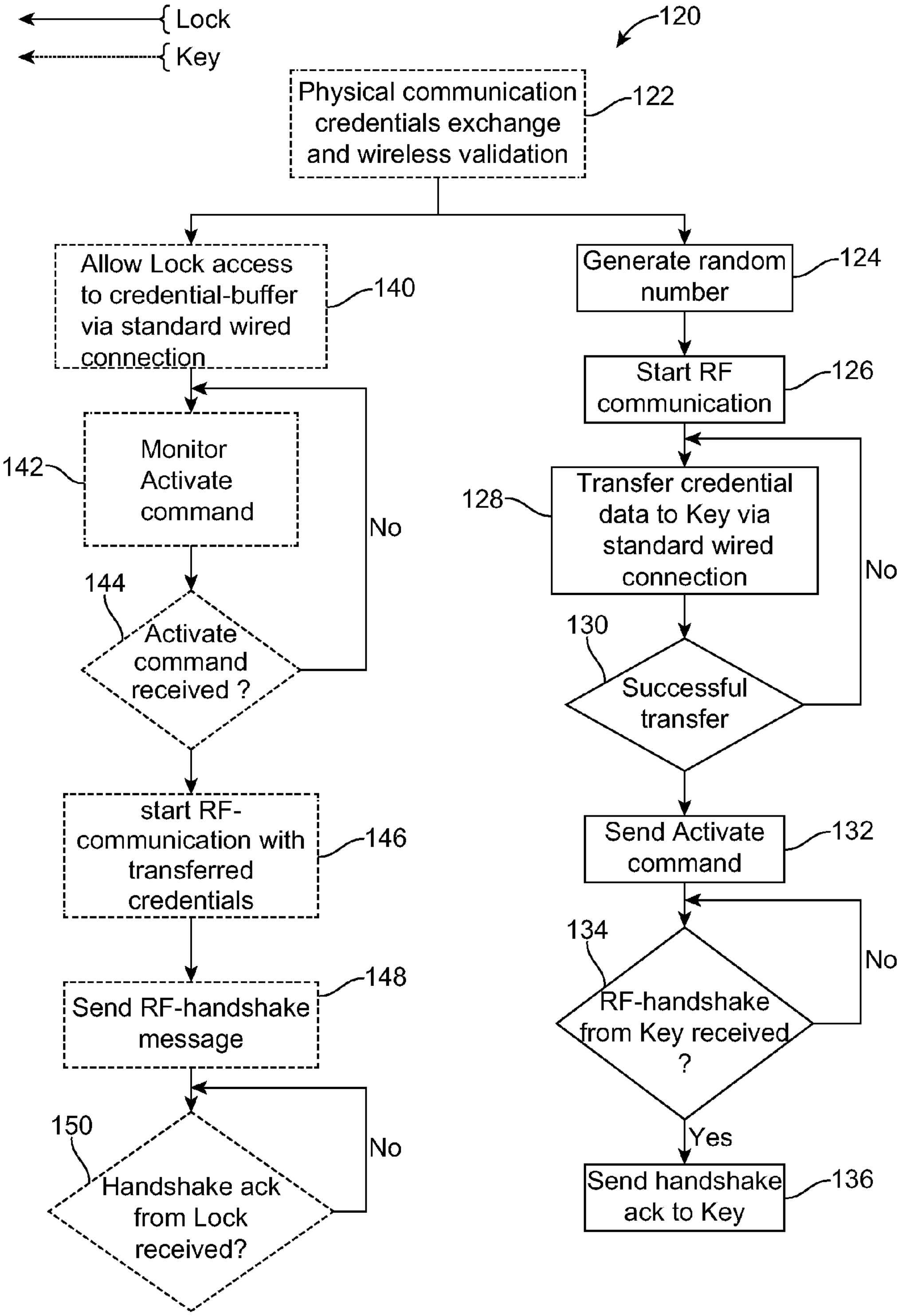

FIGS. 5 and 6 show flow charts of some of the relevant steps performed by the lock and key during handshaking. FIG. 5 shows the flow chart 100 of the relevant steps performed by the lock 12 and key 14 during handshaking, in accordance with an embodiment.

At step 102, handshaking begins and physical authentication between the key 14 and lock 12 starts at step 104. Physical authentication is verification of the key 14 to be the expected mating device, in addition to the generation of a wireless communication encryption key as well as a password generation, all of which are employed for activation of the current session. The password and wireless communication encryption key are collectively herein referred to as "credential data". A new 'session' begins each time the key and the lock are physically connected to each other for the purpose of the activation of an event. In an embodiment, each time a new session starts, a new password and encryption key are generated. Alternatively, a new session need not trigger the generation of a new password and encryption key, rather, the frequency of such generation can be a design choice. However, it should be appreciated that this frequency may affect the strength of the security associated with the device 10.

It is noted that as part of the security offered by the device 10, the wireless communication encryption key and the password, generated during handshaking, are generated on-the-fly using a random number generator and not predetermined.

Referring still to FIG. 5, in the above-noted manner, the lock 12 authenticates the key 14. At 106, a determination is made of whether or not physical authentication passes and if so, the process moves onto the step 110, whereas, if it fails (the key or lock are not as expected), the process moves onto the step 108 at which time the user of the device 10 is notified of the failure.

At step 110, wireless electronic authentication is initiated between the key 14 and lock 12. That is, upon the key 14 being physically disconnected from the lock 12, it is carried to a place remote from the lock 12 and electronic authentication, using wireless transmission, is conducted by them (at step 110). Electronic authentication is determined to pass or not at step 112 and if it fails, the user is notified at step 108, otherwise, the process continues to step 114 where the key 14 and the lock 12 are activated in that they can fully perform, either individually or collectively, the functions intended for them to perform. In FIG. 5, the solid lines indicate steps performed solely by the lock 12 whereas the dashed lines indicate steps performed by both the key 14 and the lock 12. In both cases, the steps are generally performed by a processor with other circuitry located internally to each of the lock and key, which are shown and discussed relative to subsequent figures.

The flow chart 120 of FIG. 6 shows further details of the activation and handshake steps of FIG. 5. In FIG. 6, the dashed lines indicate corresponding steps/decisions performed by the key 14 and the solid lines indicate corresponding steps/decisions performed by the lock 12. For example, the step 122 and all of the steps/decisions shown thereafter on the left side of the page, i.e. 140, 142, 144, 146, 148, and 150 are performed by the key 14 and the remaining steps/decisions shown in FIG. 6, are performed by the lock 12.

Starting at 122, physical communication credentials exchange and wireless validation between the key and the lock starts as follows.

The key 14 performs the step 140, which is to provide its credentials to the lock 12 via its standard wired connection. Credentials may be saved in a credential—buffer, which is a memory location in the key processor 80, such as the buffer 88, for saving the credential data. Credential data include a signature identifying the key that is physically connected to the lock and used for authentication by the lock. Examples of other credential data are an encryption key that makes the wireless communication between the key and the lock secure and a termination key that ensures the correct termination command is being used. This step is performed when the lock 12 and the key 14 are physically connected 20, such as shown in FIG. 1.

Next, at step 142, the key 14 awaits receipt of an activation command from the lock 12 and at 144, a determination is made by the key 14 as to whether or not the awaited activation command is received and if so, the process continues to step 146, otherwise, the process goes back to and continues from step 142. Upon receipt of the activation command, at step 146, radio-frequency (RF) communication starts between the lock 12 and key 14 using the wireless communication encryption key of the credential data that has been transferred from the lock 12 to the key 14 in step 140. As previously noted, the generation of a unique wireless communication encryption key for the activation of a session increases the level of security of the wireless communication between the key 14 and the lock 12.

Next, at step 148, the key 14 sends a handshake message to the lock 12 through RF transmission. Upon sending the handshake message, the key 14 awaits an acknowledgment of its handshake message from the lock 12, at 150. Once acknowledgment is received by the key, the handshake and activation process is completed.

At step 124, performed by the lock 12, a pseudo-random number is generated as the wireless communication encryption key and another random number is generated as the password, the credential data, employed for the particular activation session that is currently underway. RF communication is initiated by the lock 12 at step 126 using the generated encryption key. The credentials data are then transmitted to the key through wired (physical) connection at step 128.

Next, at 130, the lock 12 determines whether or not the transmission of step 128 is successful and if so, the lock 12 executes step 132, otherwise, it executes step 128 until the credential data transfer is successful.

At step 132, an activation command is sent to the key 14 to activate the key and at 134, receipt of the handshake message from the key is awaited. This is the handshake message of step 148. Upon receipt of the handshake message from the key 14, at step 136, the lock 12 sends an acknowledgment to the key 14. This is the acknowledgment the key awaits at 150.

In the case where the lock 12 operates as a stand-alone unit, without the key 14, activation is initiated either by setting up a new password for the session via the keypad 22 or using the current password. The user can use the keypad 22 to provide the necessary commands to operate the device including of a command indicating the stand alone mode being employed.

In some embodiments, operation of the user monitor key can be performed by the lock 12 communicating wirelessly with portable device, such as a smart device. In an alternative configuration, communication can be consummated through a cable connection.

FIGS. 7-9 and 11-12 show various exemplary applications of the device 10 in accordance with methods and embodiments.

Figure 7:
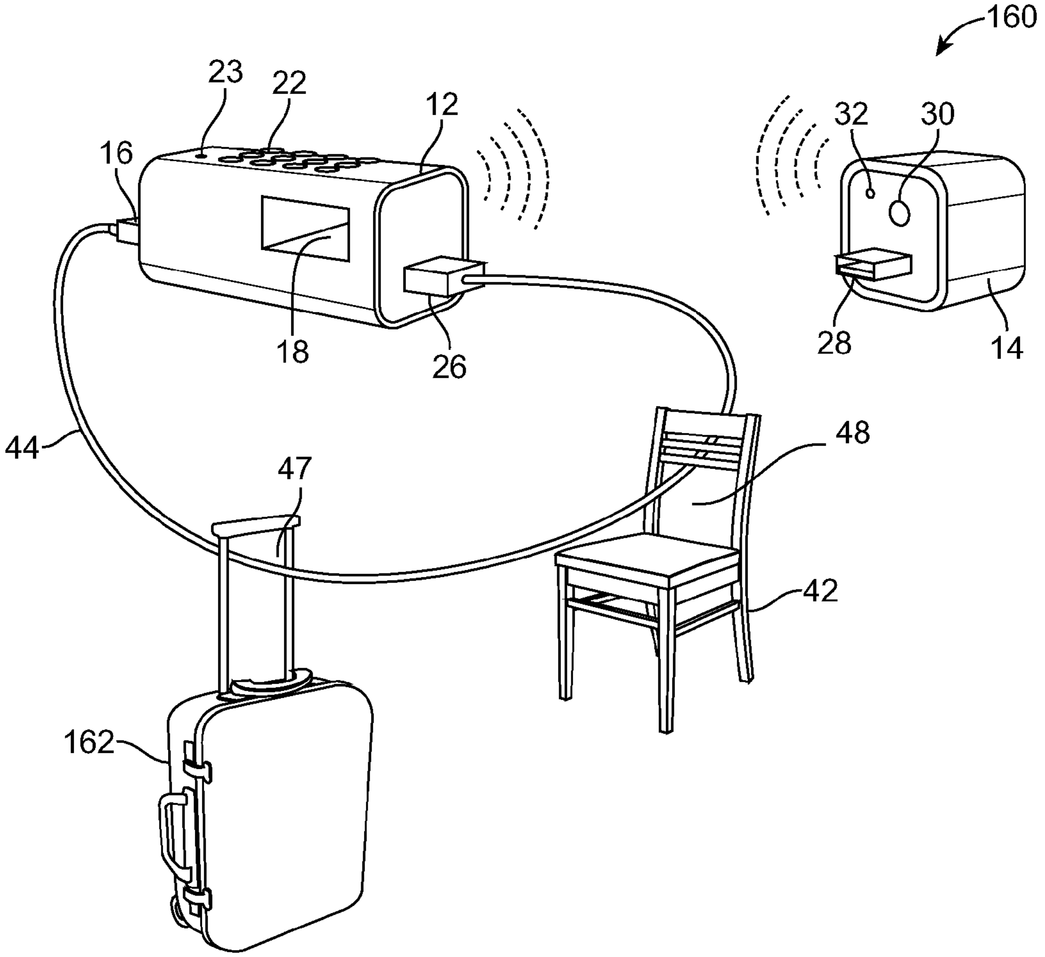
FIGS. 7, 8*a*, 8*b*, 9, 11*a*, 11*b*, 12*a* and 12*b* show various applications of the device 10, in accordance with methods and embodiments.

In FIG. 7, the application 160 is securing the luggage 162. In this example, the chair 42 is used as the anchor mechanism, as it is hard to move. At airports, for instance, benches are permanently affixed to the floor and cannot be readily removed. In this sense, they serve as good candidates for anchoring. The key 14 is remotely located relative to the lock 12 and communicates with the lock 12 wirelessly.

The cable 44 is connected at one end to one of the connectors, i.e. the connector 26, of lock 12 and connected, at an opposite end to another connector, i.e. the connector 16, of the lock 12. From the connector 26 to the connector 16, it travels through the space of the headrest of the chair 42 to and through the carrying apparatus of the luggage 162. Alternatively, the cable can be made to go through the handle of the luggage. In this manner, the cable 44 causes a closed electrical loop from the connector 26 to the connector 16 thereby allowing current to flow therethrough. Current further flows through the lock 12. Once this electrical path is established, it is monitored and if detected by the first active circuit in the lock 12 to be interrupted, the lock 12 alerts the key 14 of the same.

The electrical loop is interrupted if any of the following occur in the example of FIG. 7: 1) the connection of the cable 44 to the connector 26 is removed; 2) the connection of the cable 44 to the connector 16 is removed; 3) the cable 44 is cut between the connectors 16 and 26; or 4) the lock 12 is cut in a manner that cuts the opening-tampering notification device 67, shown in FIG. 4.

An undesirable removal of the luggage 162 would have to involve disconnecting the cable 44 from the connector 16 or in any other manner disconnecting the cable 44 or breaking the physical loop the cable 44 forms through the chair 42 and the lock 12. Accordingly, the mechanism of FIG. 7 acts as a deterrent against malfeasance of the luggage 162 and in this manner protects the luggage. In the event of a malfeasance, the user is immediately alerted and can act quickly to save the luggage.

Upon detecting tampering, the lock 12 signals the key 14, which alerts the user. An embodiment of an alert is a flashing light indicator 32. As previously noted, numerous other types of indication are contemplated and too many to list here.

In the case of a standalone lock 12, without key 14, the same can be performed but excluding communication with the key 14.

Figure 8A:
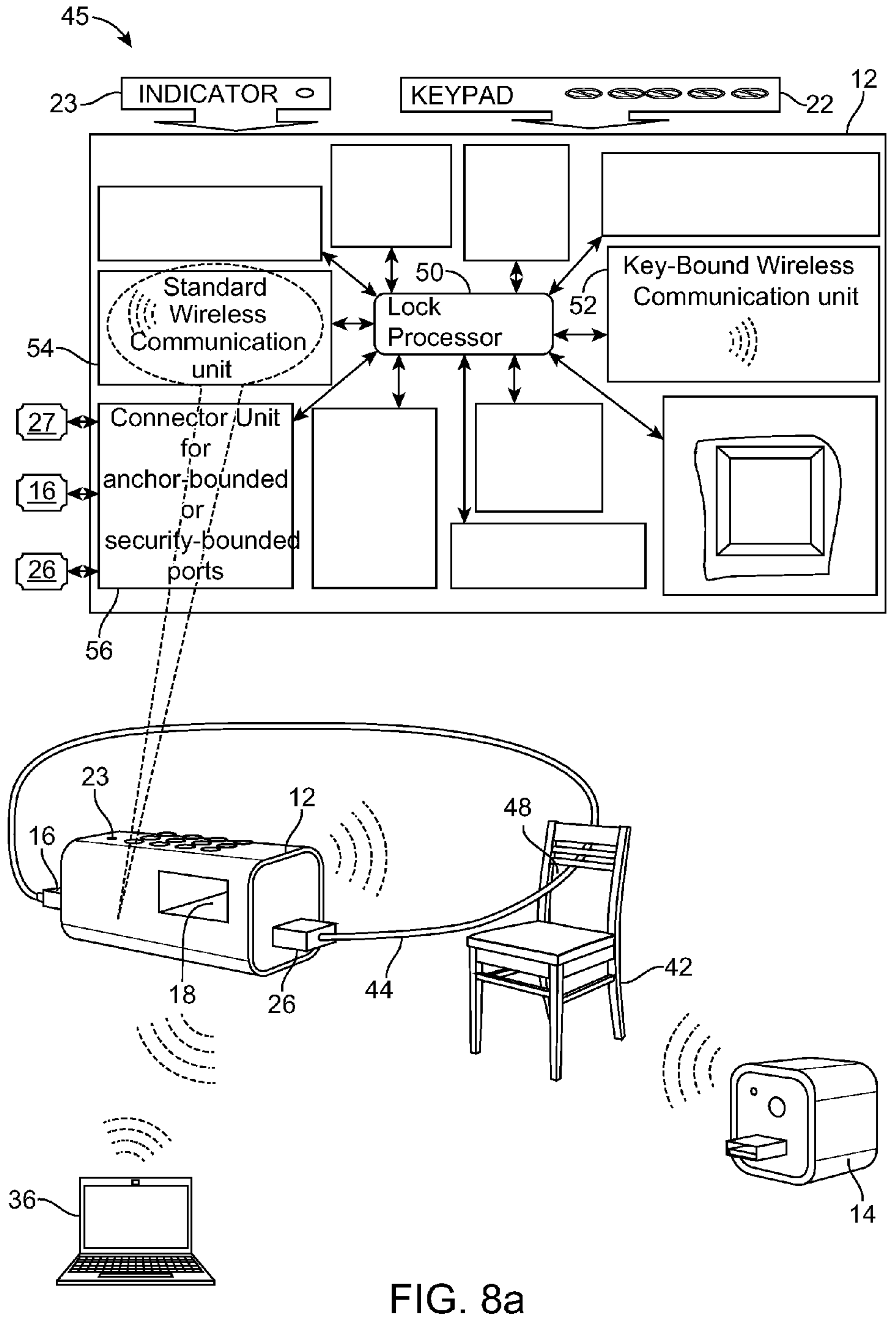

FIG. 8*a* shows an exemplary application of the device 10 where the lock 12 secures the device being protected, i.e. the laptop 36, wirelessly (or "virtually"). In this manner, the cable 44 need not go through any part of the laptop as it did in the application of FIG. 3 where the laptop 36 was connected through cable 44 to lock 12. The chair 42 serves as an anchor and the connection of the cable 44 relative to the lock 12 is analogous to that of FIG. 7 except that the cable 44 goes through the head-rest of the chair 42 and not any part of a luggage. In the embodiment of FIG. 8*a*, the range of signal matters in that the physical distance between the laptop 36 and lock 12 needs to be within the wireless capability of the lock 12 outside of which the lock 12 fails to properly communicate with the laptop 36. In fact, it is this very feature that protects the laptop 36 against tampering or theft. That is, if the laptop is physically taken outside of the range of proper wireless communication between the lock 12 and the laptop 36, the lock 12 treats this lack of communication with the laptop 36 as an undesirable event and wirelessly alerts the key 14, accordingly. In an embodiment, the lock 12 not only alerts the key of the undesirable event, it also sets off some kind of an alarm for local notification.

FIG. 8*a* shows an example of the protection of an active device, i.e. laptop 36, whereas FIG. 7 shows an example of the protection of a passive device, i.e. luggage 162.

Further shown in FIG. 8*a* are relevant structures within the lock 12 that take part in the application of lock 12 shown in FIG. 8*a*. These structures are emphasized, in FIG. 8*a*, by showing the contents of the blocks introduced in FIG. 4, whereas, non-active structures are shown as blank shapes.

In the case of standalone operation of lock 12 without key 14, the same operation is valid as above with the exception of the communication with key 14.

Figure 8B:
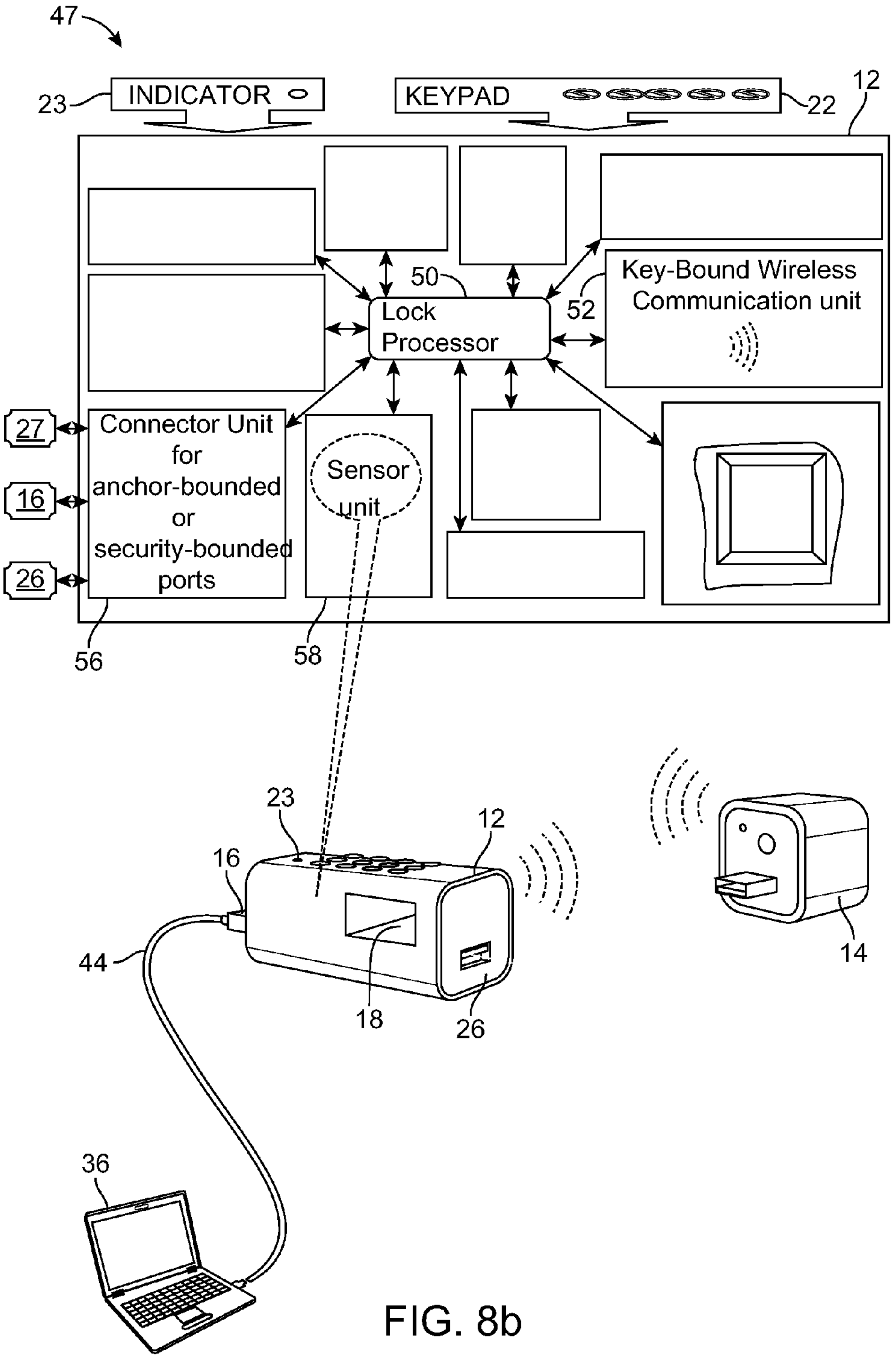

FIG. 8*b* shows an exemplary application of the device 10 where the lock 12 is anchored virtually. In this manner, the sensor unit 58, which may be one or more of an accelerometer, motion detector sensor or any other sensor suitable for sensing a desirable metric., detects movement of the lock 12 relative to the lock 12's original position. In this manner, the sensor unit 58 serves as a virtual anchor for the lock 12. Alternatively, in the case of employing a motion detector sensor, a global positioning system (GPS) may be employed. Still alternatively, instead of sensing motion, the sensor unit 58 may sense an environmental factor, such as without limitation, temperature, moisture, and pressure.

Further shown in FIG. 8*b* are relevant structures within the lock 12 that take part in the application of lock 12 shown in this figure. These structures are emphasized, in FIG. 8*b*, by showing the contents of the blocks introduced in FIG. 4, whereas, non-active structures are shown as blank shapes. In the case where the lock 12 is employed in standalone mode, without use of the key 14, the foregoing discussion applies with the exception of communicating with the key 14.

Figure 9:
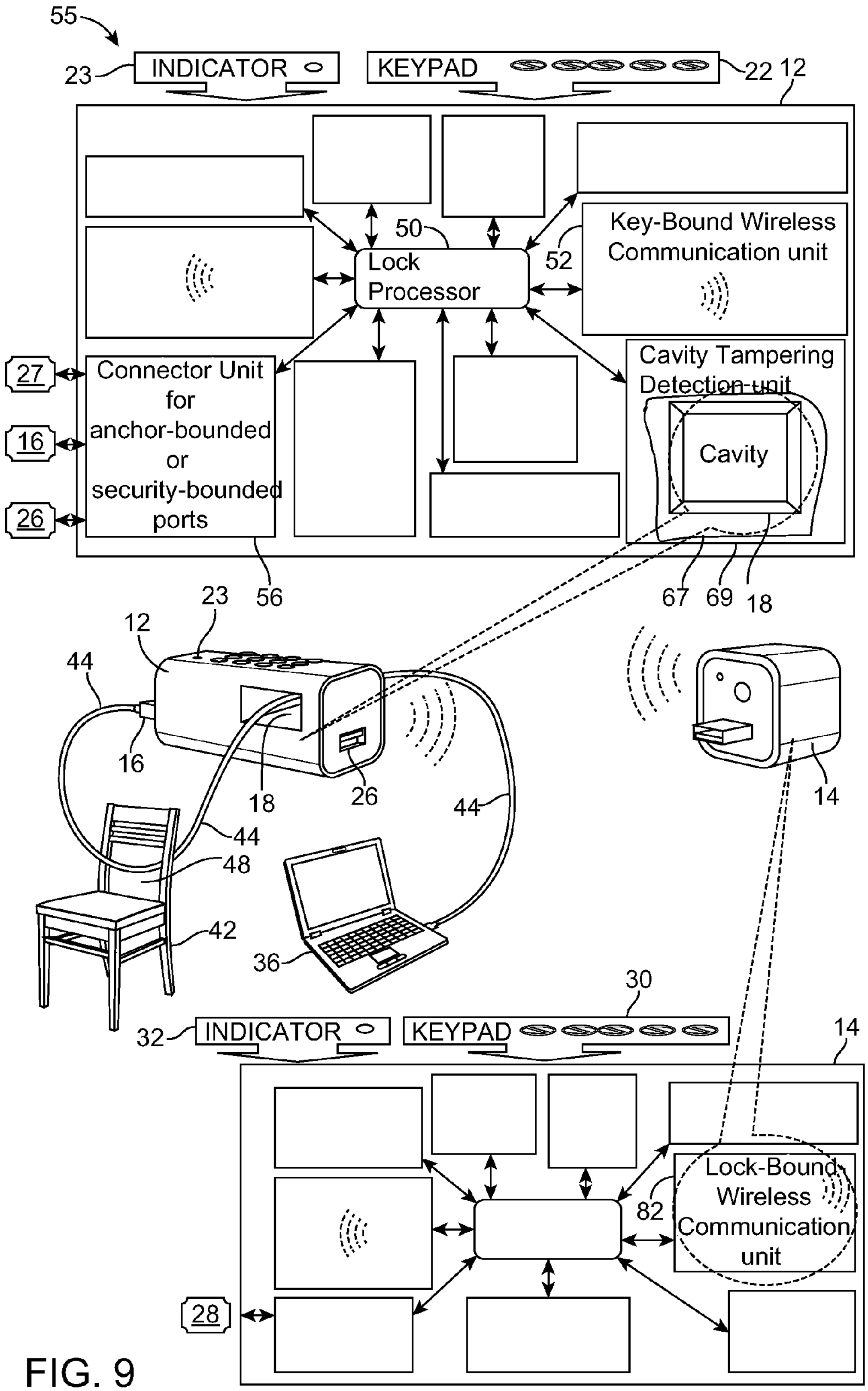

In FIG. 9, yet another exemplary application of the device 10 is shown with some of the relevant structures of the lock 12 and the key 14 that are active in this example, highlighted in the same fashion as the highlights of FIGS. 8*a* and 8*b* discussed above.

In the example of FIG. 9, the laptop 36 is shown to be physically connected, through cable 44, to the connector 16 of the lock 12 in a manner as follows. The chair 42 is used as an anchor and the cable 44 is connected at one end to the laptop 36 and at another end, threaded through the opening 18. Once the cable 44 is threaded through the opening 18, it travels through a portion of the backrest of the chair 42, shown at 48 and thereafter connects with the connector 16 of the lock 12. As shown in FIG. 9, the lock 12 and key 14 communicate wirelessly, as shown and discussed relative to prior figures. As is the case with most, if not all, of the embodiments shown in the various figures of this patent document, the lock 12 can operate as a standalone unit, in the application of FIG. 9.

Use of the opening 18 frees up the connector 26 in the application of FIG. 9 because the cable 44 connects to the lock through only one of the lock's connectors, i.e. the connector 16, leaving connector 26 of the lock 12 and any other external connector that may be used, available. In this manner, the opening 18 allows for anchoring and securing to be done with only one cable. Whereas, in the application of the device 10, in FIG. 9, the opening 18 is a part of anchoring, in FIG. 3, it is not utilized at all. Therefore, the application of FIG. 3 requires two connectors, such as connectors 26 and 27, whereas the application of FIG. 9 only requires one connector, such as connector 16.

Undesirable events, such as those discussed relative to previous figures, are detected by the lock 12, in large part, due to the presence of the electrical path that starts from the laptop 36 and goes to the connector 16. Detection is triggered in first active circuit either by the tampering with the opening 18 and/or the cable 44. Tampering with the opening 18 is detected through configuration described in FIG. 10. Tampering with the cable 44 entails disconnection from either connection 16 or laptop 36 or cutting the cable 44.

Similar to FIG. 7, cable 44 can be made to go through the handle of the luggage 162 and secure both active device 36 and passive object 162.

Figure 10A:
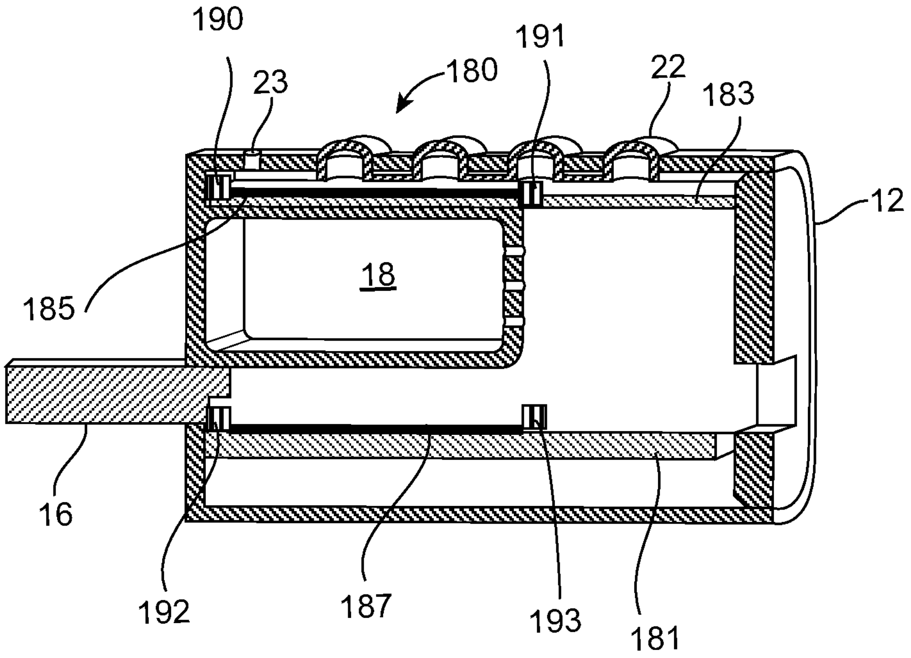
FIG. 10*a* shows a cross sectional side view of the inside of the lock 12 essentially without a detection feature.
Figure 10B:
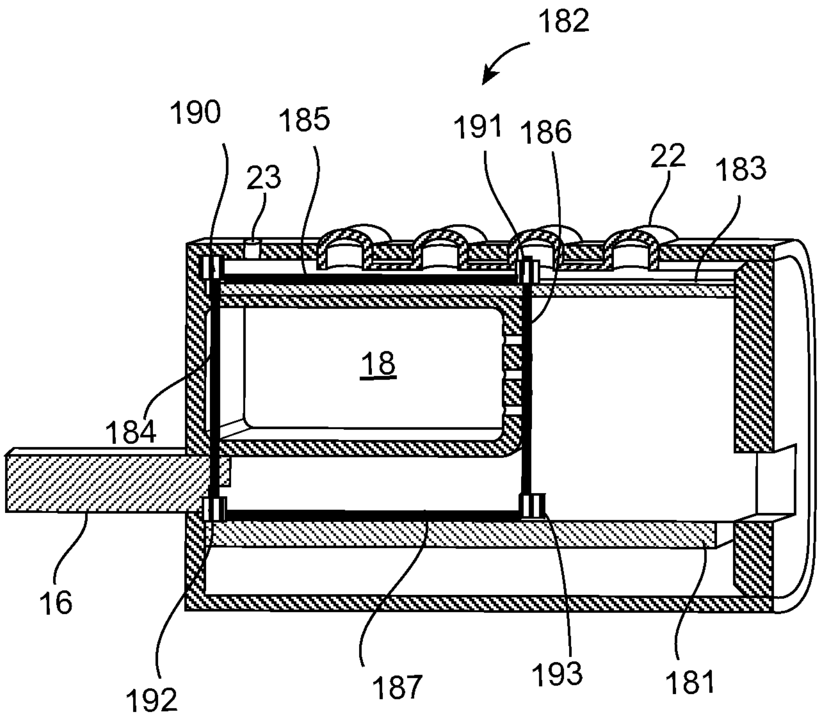
FIG. 10*b* shows a cross sectional side view of the inside of the lock 12 with a tampering detection feature.

In FIG. 9, relevant structures employed for this application are shown in the drawing of the lock 12 as well as that of the key 14. FIG. 10*a* shows an internal cross section side view of the lock 12 essentially without a tampering detection feature for opening 18. FIG. 10*b* shows an internal cross section side view of the lock 12 with a tampering detection feature.

In both FIGS. 10*a* and 10*b*, the lock 12 is shown to include a bottom board 181, a top board 183, board connectors 190-193, wire 187, and wire 185, all of which are shown located on a top surface of the top board 183. The lock 12 is further shown to include wire 187, which is shown located on top surface of the bottom board 181. Wire 185 extends between the connectors 190 and 191 thereby causing electrical coupling of these connectors. Similarly, wire 187 extends between the connectors 192 and 193.

In FIG. 10*b*, wire 186 causes electrical coupling of the connector 191 with the connector 193. Similarly, wire 184 causes electrical coupling of the connector 190 with the connector 192. The combination of wires 184, 185, 186, 187 connected to one another through the connectors 190, 191, 192, 193 creates the electrical loop 67 around the opening 18. Any cut of the opening, either on the top and bottom or the other two sides, causes an interruption of the current flow in loop 67 and is detected by the processor 50 which is connected to the loop 67.

Figure 10C:
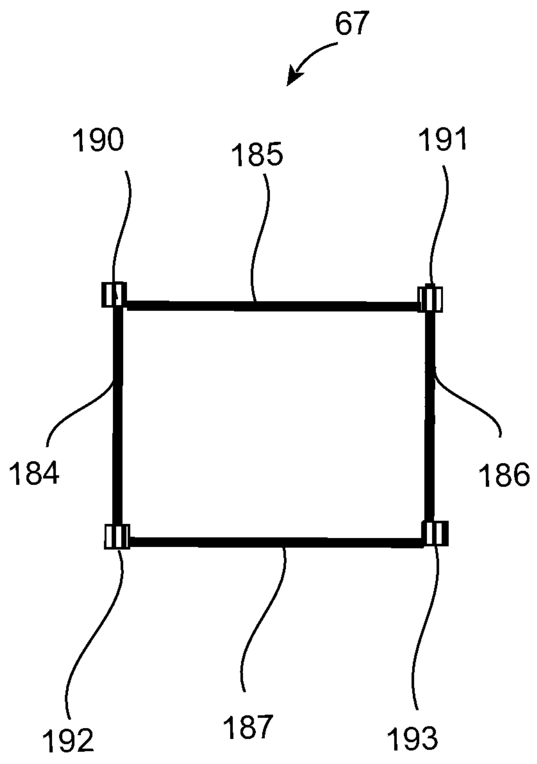
FIG. 10*c* shows an isolated view of the detection feature.

FIG. 10*c* shows an exploded view of the loop 67. As shown in FIG. 10*c*, the loop 67 is made of a combination of the connectors 190, 191, 192, 193 and wires 184, 185, 186, 187.

Figure 11A:
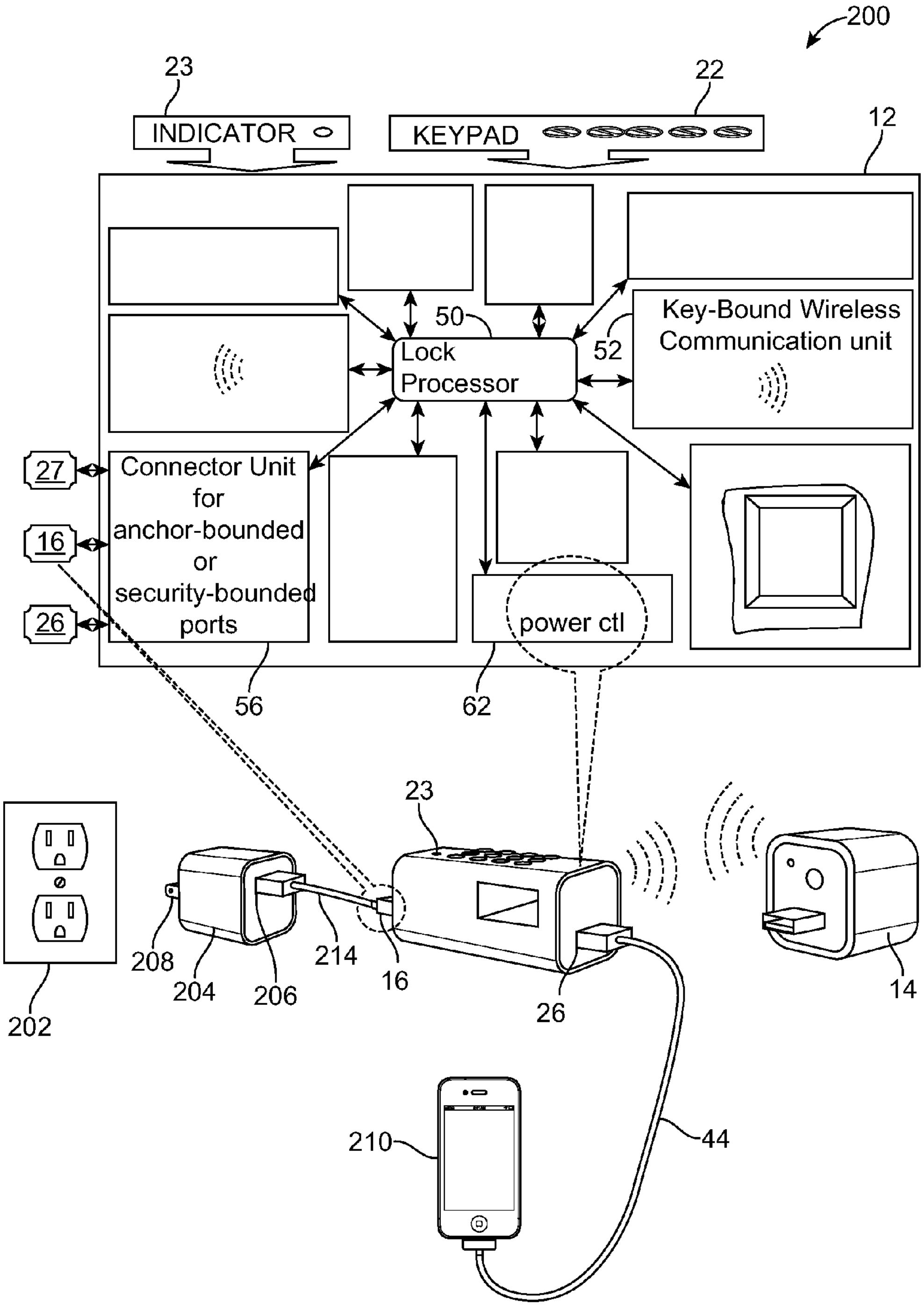

FIG. 11*a* shows yet another exemplary application of the device 10 for deterring/protecting/monitoring of a user device. In this application, the lock 12 is anchored to the wall through its connection via the cable 214 to the charger 204 and the charger 204 being plugged 208 to the wall outlet 202. In case, the wall outlet had a common connection interface such as USB built in, the lock 12 could directly anchor to this outlet via cable 214.

In the configuration of FIG. 11*a*, a phone 210 is secured through its connection to the lock 12 via cable 44. If needed, the phone 210 can also get charged by the battery charger 204 through the lock 12. In this configuration, the phone 210 can be secured while being charged. The lock 12 wirelessly reports any malfeasance related thereto to the key 14 As in the case of FIGS. 8*a*, 8*b* and 9, some of the relevant portions of the inside of the lock 12 are highlighted in FIG. 11*a*. In another embodiment, there can exist an internal charging system such as a charger or an adapter in the lock deterrent device. For example, the internal charging system can also have a 110V connector to be able to connect to the power outlet 202 directly or a 12V connector to be connected to a laptop charger. The lock deterrent device can charge the device being protected in two ways: either by its own battery power or through an internal or external battery charger when it is anchored to a power source 202 or external charger 204.

In FIG. 11*a*, the device being protected, the mobile device or cell phone 210 is secured through cable 44. It could also be any other active device, such as a laptop. In the case where the lock 12 operates as a stand-alone unit, without the key 14, the only difference is that the communication with key 14 does not take place.

Figure 11B:
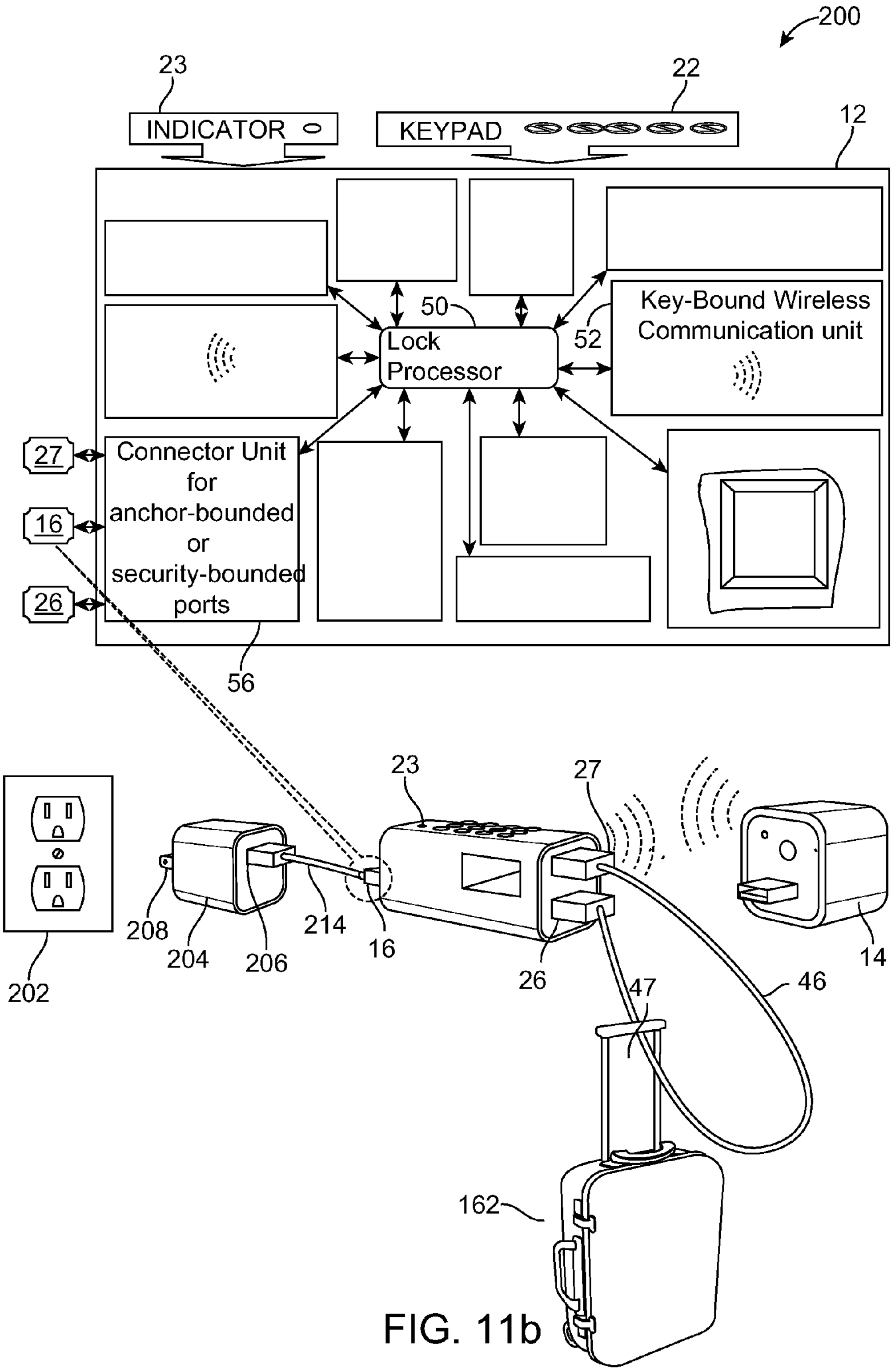

The embodiment of FIG. 11*b*, while shows the same anchoring as in FIG. 11*a*, it shows how to secure a passive object 162.

Figure 12A:
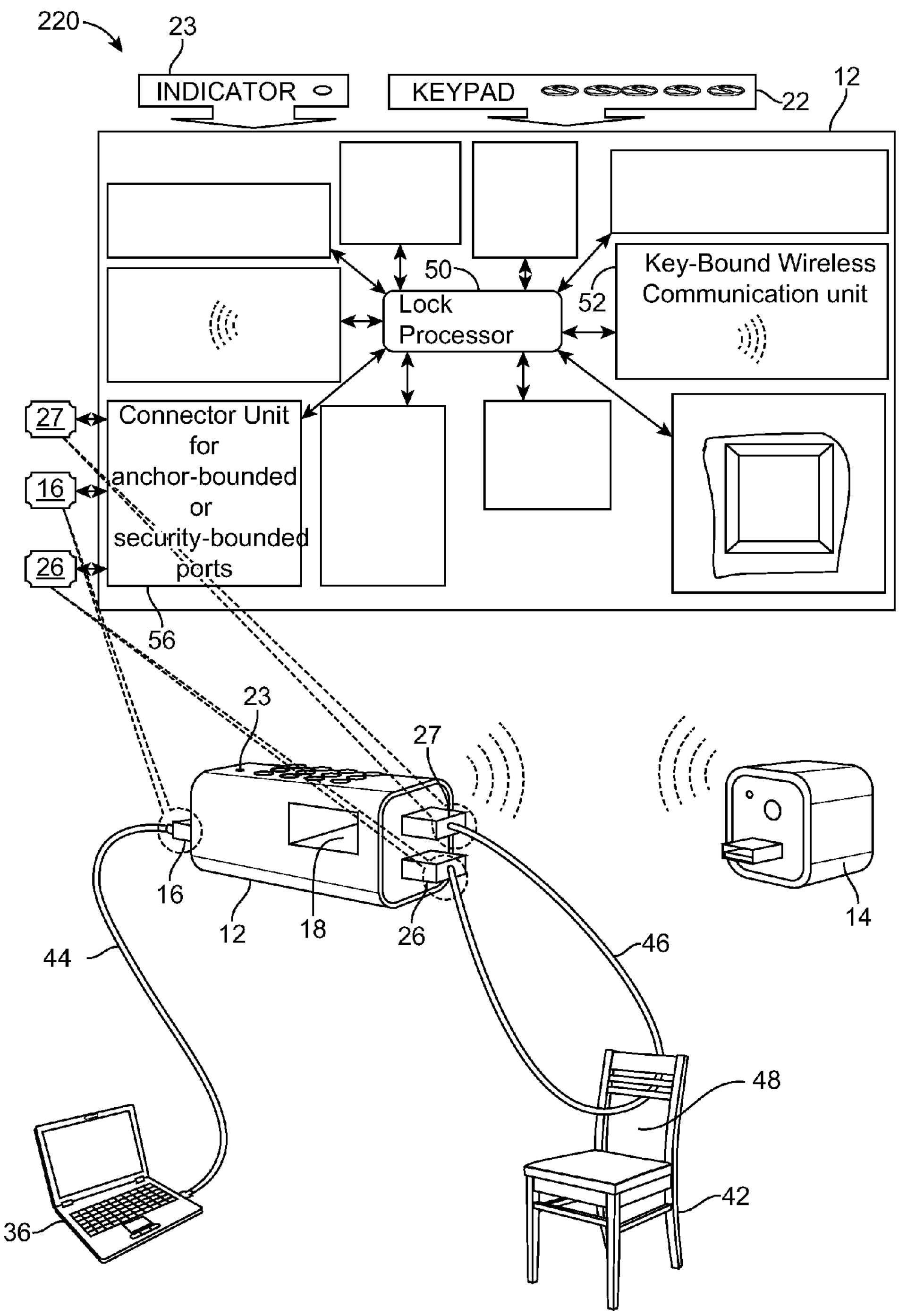

The embodiment of FIG. 12*a* is analogous to the embodiment of FIG. 3 with the exception of the particular internal blocks of the lock 12*a* that are actively in use being shown in the configuration of FIG. 12*a*.

Figure 12B:
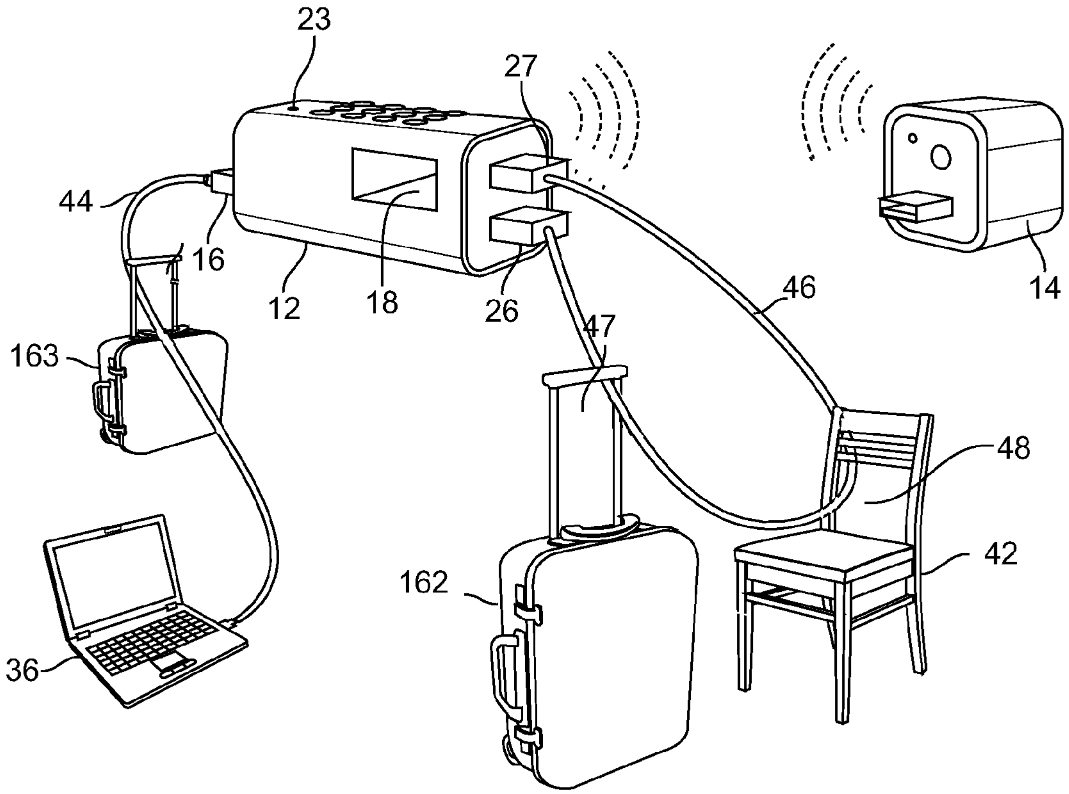

The embodiment of FIG. 12*b* is analogous to the embodiment of FIG. 12*a* and shows any secure path 44 or the anchored loop 46 can also secure passive objects 162 and 163.

Figure 13:
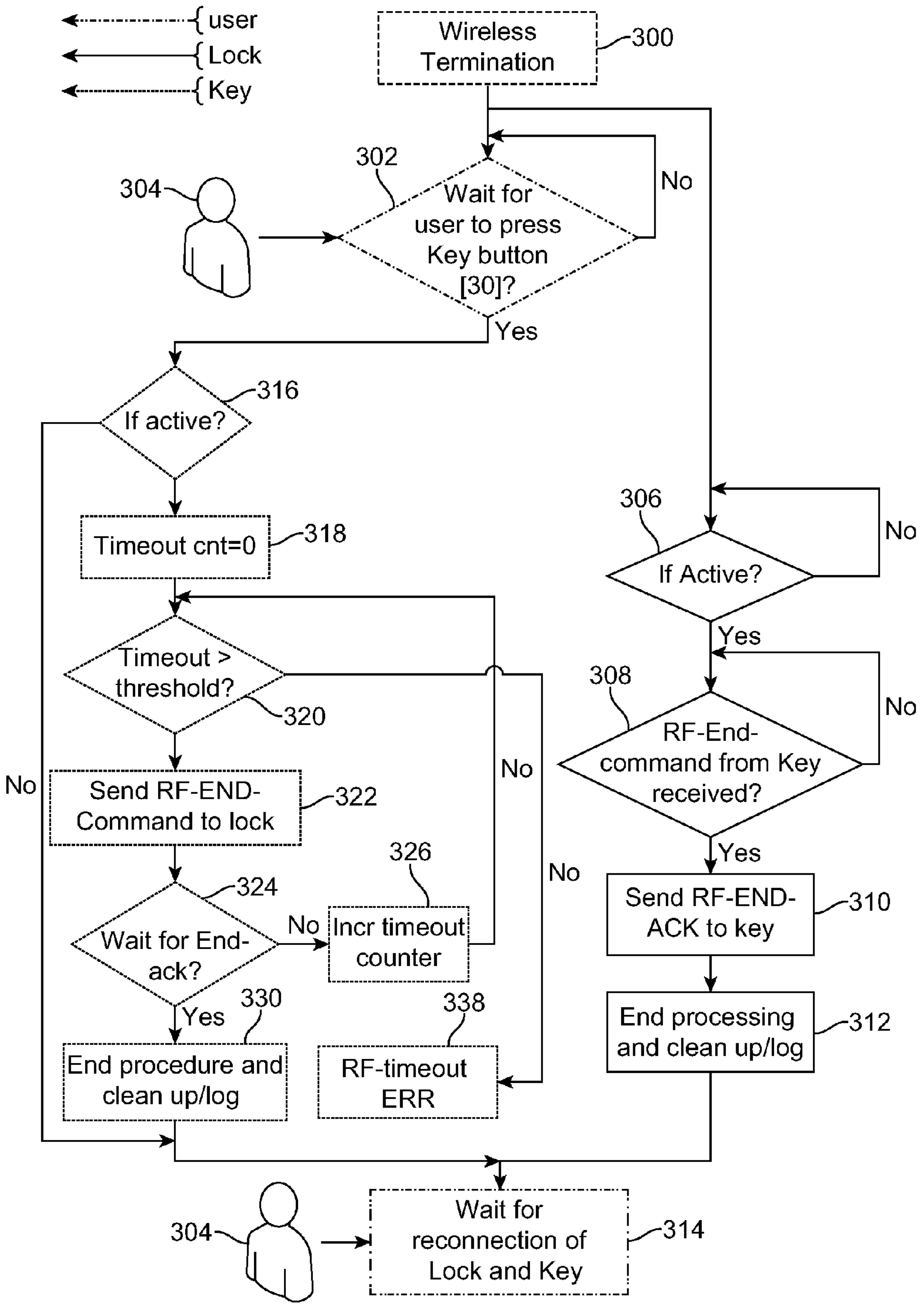
FIG. 13-15 show flow charts of some of the relevant operational steps performed by the lock and key.
Figure 14:
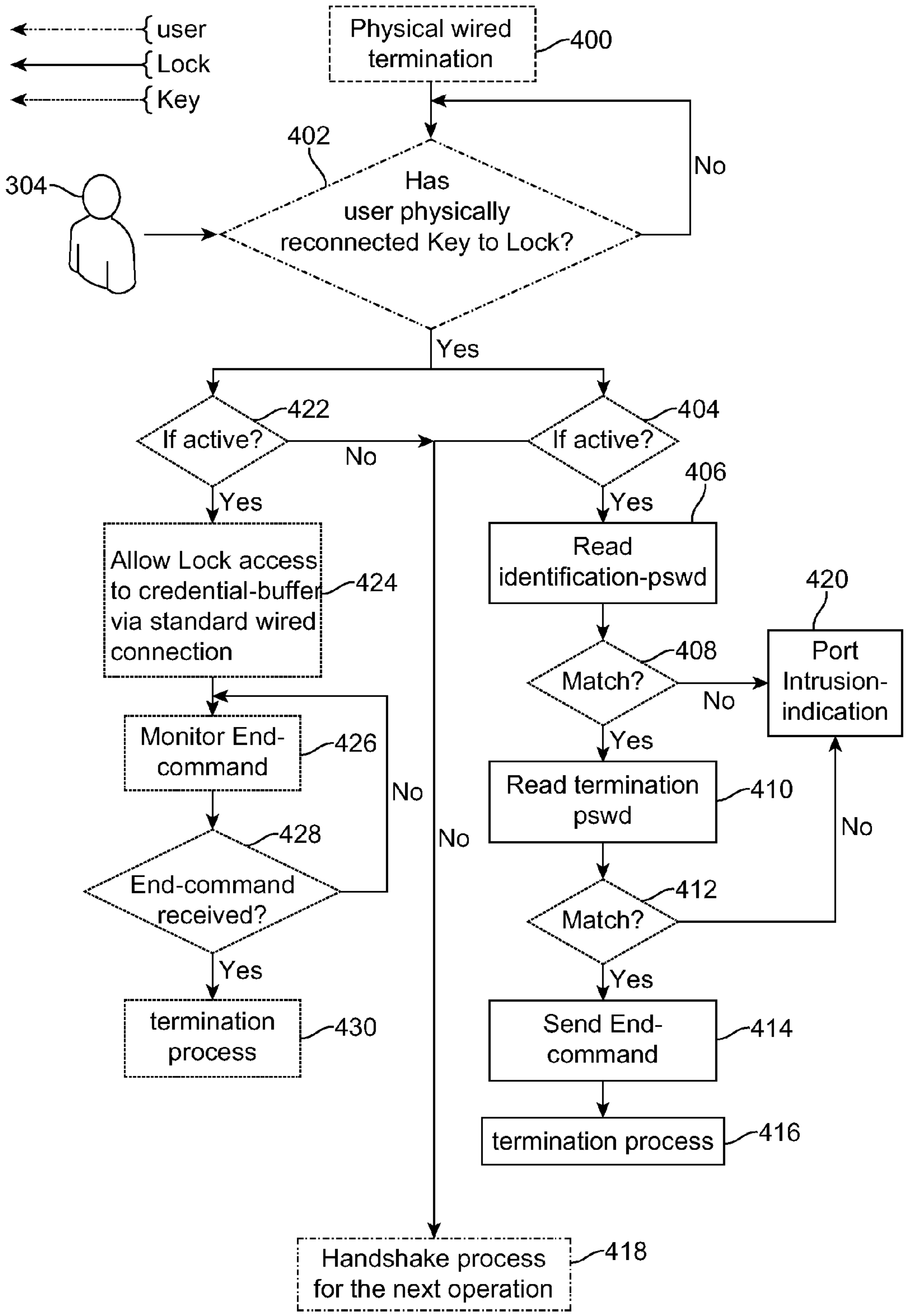
Figure 15:
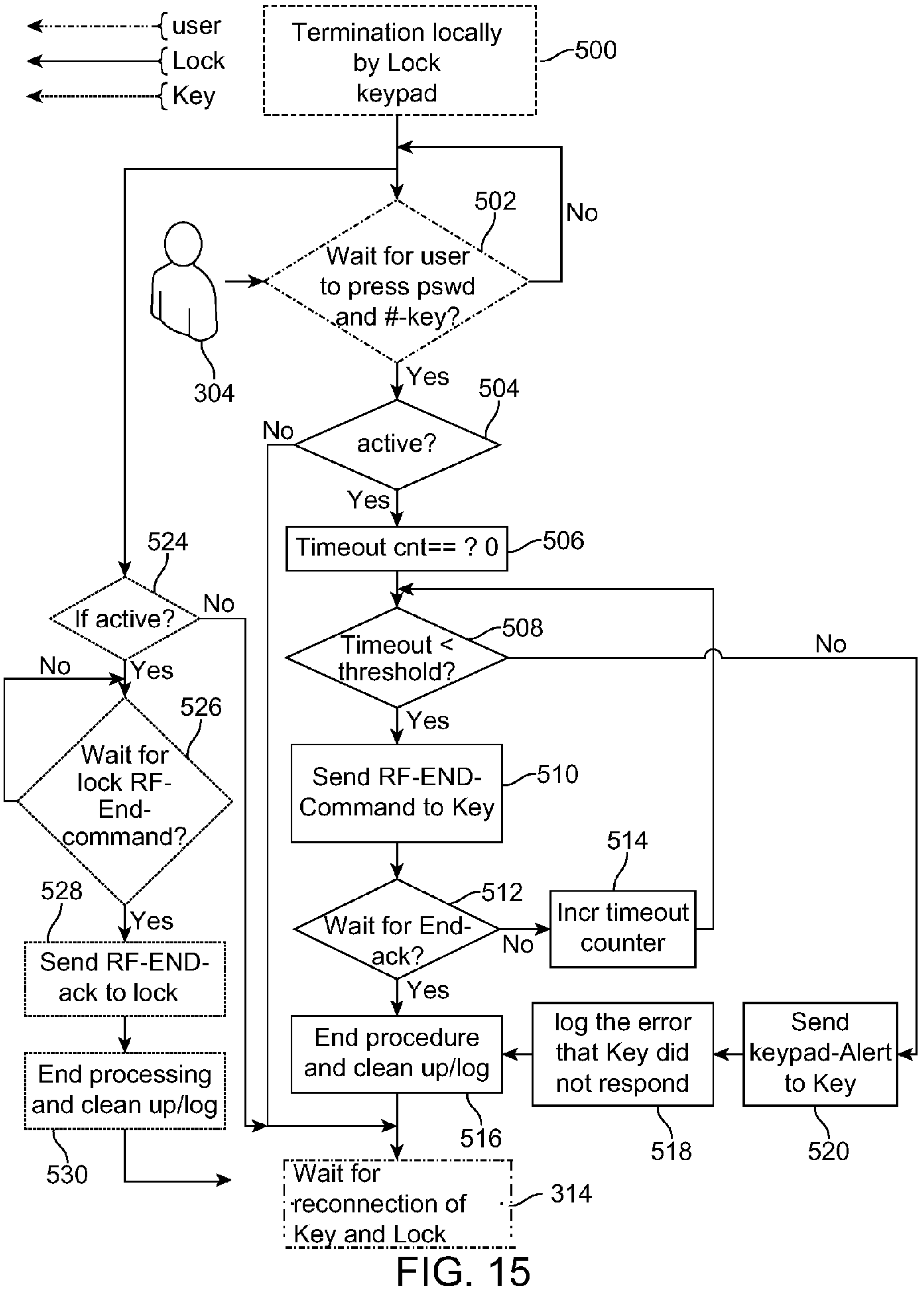

FIGS. 13-15 show flow charts of some of the relevant operational steps performed by the lock 12 and key 14. At step 300, wireless termination of the lock 12 via the key 14 begins.

In accordance with a method, termination may be done through the key in "wireless" mode. In yet another method, a password is used through the communication pad of the lock 12 to terminate and yet another method, termination is done through physically mating of the key and the lock.

After step 300, at 302, a determination is made as to whether or not the user 304 has entered a valid/recognized message, such as a number, through the key's communication pad and if not, the process waits until this occurs, and if so, the process continues to 316. From 316, the steps thereafter are performed by the key 14 and the steps from and including 306 (shown on the right side of FIG. 13) are done by the lock 12. At 316, if the key is active, the process sets a timeout counter to zero at step 318 and determines whether or not the timeout counter is at a predetermined threshold at 320 and if so, the process moves onto the step 322, otherwise, the process goes to step 338. At step 338, an error is noted. At step 322, an end-command is sent to the lock wirelessly and the process moves onto 324, where the key waits for acknowledgment from the lock.

After step 322, the key waits for an acknowledgment from the lock and upon receiving acknowledgment, the key ends this (termination) procedure and performs clean up or log, at step 330. As used herein, "clean up" and "log" refer to initializing parameters at the end of the procedure to prepare for starting for a new activation.

After step 330, at step 314, a wait period takes place for the lock and the key to reconnect.

At 306, a determination is made as to whether or not the lock is active and if the lock is determined to be active, the process continues to step 308 waiting for receipt of a RF-End command from the key, otherwise, the lock ignores the RF_End command from the key. After 308, at step 310, an acknowledgment is sent to the key. Next, at step 312, the termination process for the lock 12 ends, much like step 330 and step 314 is performed.

FIG. 14 shows some of the steps, in flow chart form, for physical termination of the operation between the lock and key. At step 400, the process begins. The user 304, at some point, needs to physically connect the key to the lock, such as shown by the connection 20 in FIG. 1. Next, at 402, a determination is made as to whether or not the lock and key are physically connected and if so, the process moves onto either 422 or 404 depending on the steps the key or the lock perform. If the physical connection has not yet been established, the process waits until they are physically connected.

The steps and decisions shown on the right side of FIG. 14, i.e. 404-416 and 420, are generally performed by the lock 12 and the steps shown on the left side of FIG. 14, i.e. 422-430, are generally performed by the key 14. At 404, the lock determines whether or not it is active. Prior to being "active", the lock is not properly operational, i.e. perform the functions it is intended to perform such as monitoring, securing, and detecting, and the like. If inactive, the process goes from 404 to the step 418 and prepares for a new session. At step 418, the lock and the key know to start the activation process described and shown relative to FIG. 6.

Upon determining that it is active, the step 406 is performed but only if the key has given permission to the lock to access its credential buffer. Access to the lock is typically provided through physical wire connection for increased security. Assuming access has been extended to the lock, at step 406, the lock reads the identification password from the buffer 88 of the key to determine the authenticity of the key. This is done, in accordance with an exemplary embodiment, by using the identification password stored in the key buffer 88 and that which is saved in its own buffer 57.

Next, the lock determines whether there is match between the identification password from the key and the password that is in its buffer 57 and when there is a match, the process moves on to the step 410, otherwise in the event of no match, i.e. the key is not authenticated, the process moves to step 420.

At step 420, the lock reports in intrusion (to the user 304), which is typically done wirelessly.

At step 410, a password that is used to verify termination, is read from the buffer 57 and at 412, it is verified, or not. In the case of verification, the process performs step 414, otherwise, the process moves onto step 420.

At step 414, the lock reports to the key to end activation. Next, at step 416, the lock carries out a termination process to end activation.

As to the key, at 422, similarly to the lock, the key determines if it is active and if so, the process continues to step 424 otherwise, the process goes to step 418. At step 424, the key gives the lock access to its buffer 88 (shown in FIG. 4), via the connection 20 (shown in FIG. 1). This is the step necessary for the lock to perform the steps from step 406 on. Next, at step 426 and at 428, the key 14 awaits receipt of the end of activation (step 414) from the lock 12 and upon receipt thereof, the key 14 performs step 430. At step 430, the key ends activation by carrying out a termination process, analogous to the step 416, performed by the lock. The foregoing ends the physical wired termination process between the lock 12 and the key 14, therefore ending this session, in accordance with an embodiment and method.

Alternatively, physical wired termination may be performed even when the key 14 is without battery power, as follows. When the lock 12 and key 14 physically mate as shown in FIG. 1, the key then utilizes the power supplied by the lock to charge the key's battery when battery power becomes low. When the key 14 is completely out of battery power, while charging the key's back, the lock 12 can act as a power source for the key processor 80, through the connection 20, to ensure uninterrupted operation of the key.

In an embodiment, the key processor 80 (shown in FIG. 4) includes memory, such Electrically Erasable Programmable Read-Only Memory ((EEPROM). In accordance with a method, handshaking credential data is stored in the EEPROM of the key processor 80, at the start of the session. When power is restored, the credential data is made available to the lock 12. The foregoing process successfully effectuates termination of the lock 12. The key also goes to the ending process and cleans up its log and prepares for next activation session. Furthermore, all information regarding tampering, intrusion, etc. are also stored in the EEPROM of the lock processor 50. Upon loss of power by the lock, still the information will be available upon power restoration.

FIG. 15 shows some of the steps, in flow chart form, performed by the lock and key, for termination of activation via the pad 22 of the lock, at step 500. At 502, the lock awaits the user's entry of a user password, which the lock uses to authenticate the user 304. Upon failure of authentication, the lock awaits entry of the correct (expected) password from the user. Upon authenticating the user 304, the lock determines whether or not it is active at 504 and if so, step 506 is performed. At step 506, the lock initializes a timeout counter. Timeout is during a period of time the lock awaits the expected password from the user after which the lock no longer awaits entry from the user. From 508 to step 514, the lock waits for receiving an acknowledgment from the key in response to its transmission of end-of-command, through RF transmission. The lock then moves onto step 516.

So as to avoid waiting indefinitely, the lock uses a threshold value to wait a predetermined amount of time for the process of acknowledgment from the key to end, as described above. The steps for doing so include steps 518 and 520 where at step 520, the lock reports failure to receive of the key's acknowledgment, back to the key and at step 518 the lock records this problem.

Steps 524 to 530 are performed by the key, i.e. the terminating activation or termination procedure. Upon determining it is activated at 524, the key, at 526, waits for the end-of-command, sent by the lock at step 510, and upon receipt thereof, it sends an acknowledgment at step 528, to the lock and ends its termination process at step 530.

Figure 16:
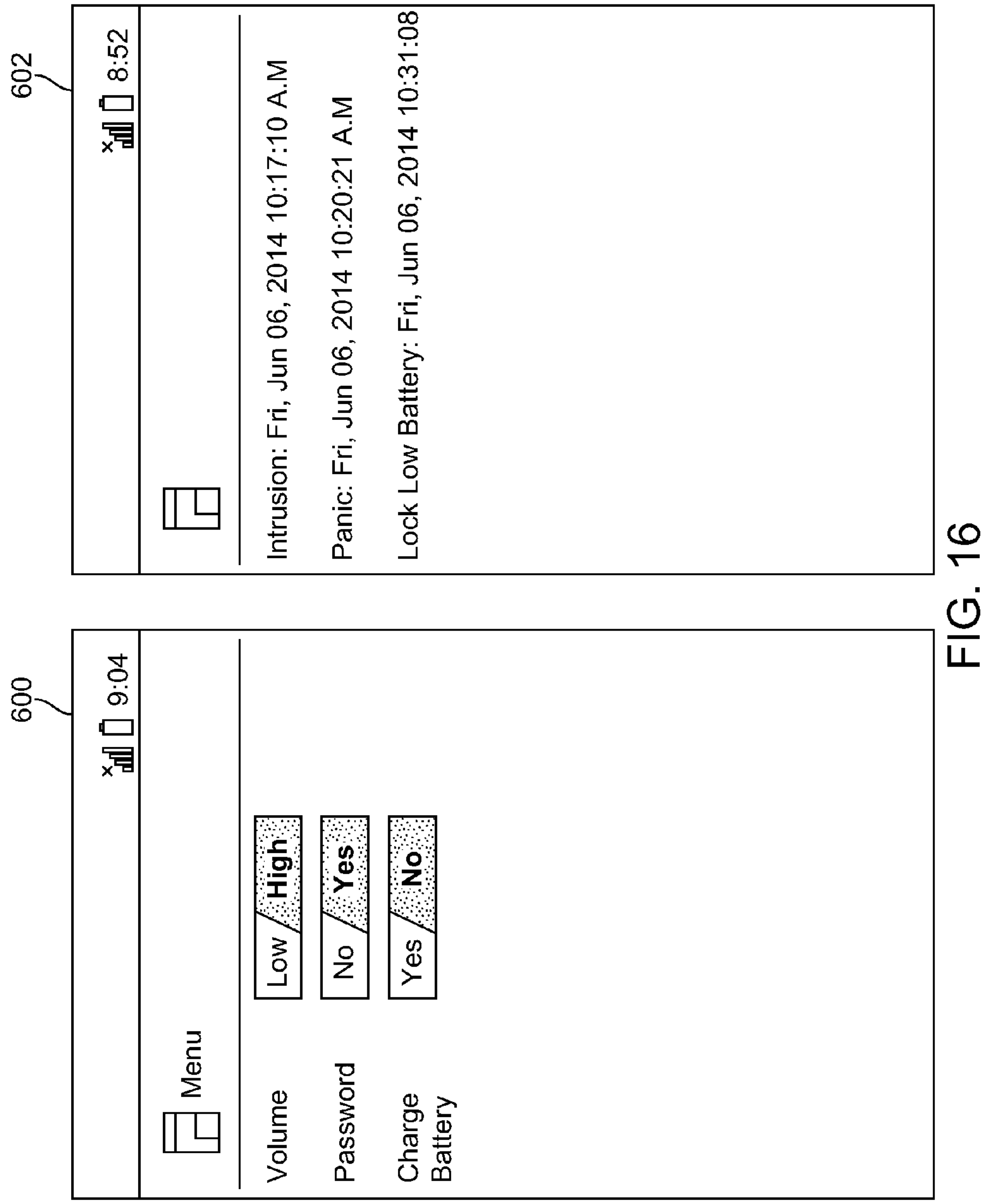
FIG. 16 shows exemplary screenshots on a mobile device of various parameters and status reported by the device 10.

FIG. 16 shows exemplary screenshots of a mobile device of various parameters and status reported by the device 10. For example, the screenshot 600 shows adjustments that can be made by the user to the volume (of alert/alarm sound), password and battery status. Screenshot 602 shows various detections by the device 10, for example, an intrusion detection at 10:17:10 AM on Jun. 6, 2014.

It is understood that the various embodiments and methods shown and discussed herein, various configurations of protecting a user object, including but not limited to, stand-alone, without use of the key 14, may be employed. Further, in place of the key 14, a general purpose user monitor key such as a smart device may be employed. In addition, the dedicated communication between the lock 12 and the user monitor key can be either wired or wireless. The dedicated user monitor key 14 can be used for activation start, monitoring and end operations among other functions. Furthermore, the lock 12 can use its keypad for certain operations and use the user monitor key 14 for other operations. In a case where the lock 12 operates without the user monitor key 14, all the operations of the lock 12 can be performed solely by itself and information may be input to the lock 12, through, for example, a keypad.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A portable theft deterrent device comprising:

a lock detection mechanism capable of forming a physical loop of one or more connectors of a plurality of connectors, wherein the physical loop comprises an electrical path having electrical flow, and the plurality of connectors includes at least one anchoring connector; wherein the lock detection mechanism includes the plurality of connectors; wherein the lock detection mechanism includes a first active circuit therein coupled to the plurality of connectors; wherein when the lock detection mechanism is coupled to the electrical path via at least one connector of the plurality of connectors and the first active circuit detects an interruption in the electrical flow in the electrical path, the lock detection mechanism provides an alert; and a monitoring key member, the monitoring key member includes a second active circuit therein that allows for wireless communication with the lock detection mechanism when detached therefrom; wherein the monitoring key member is configured to receive the alert remotely and wherein the monitoring key member includes at least one key connector capable of forming an electrical path having electrical flow with the anchoring connector of the lock detection mechanism.

2. The portable theft deterrent device of claim 1, wherein the alert can be any of a light, beep, remote notification, horn, vibration and alarm.

3. The portable theft deterrent device of claim 1, wherein the electrical path comprises an anchor for the anchoring connector of the lock detection mechanism.

4. The portable theft deterrent device of claim 3, wherein the electrical path loops through an opening in a not easy to move object.

5. The portable theft deterrent device of claim 1, wherein a portable device is secured by providing an electrical path between the portable device and the lock detection mechanism.

6. The portable theft deterrent device of claim 3, wherein the anchor comprises any of a virtual or physical anchor.

7. The portable theft deterrent device of claim 5, wherein the portable device is secured either through wireless or wired connection or both.

8. The portable theft deterrent device of claim 5, wherein the electrical path anchors the lock detection mechanism to a hard-to-move object and secures the portable device through the same electrical path.

9. The portable theft deterrent device of claim 1, wherein the lock detection mechanism includes a keypad, wherein the keypad enables and disables the lock detection mechanism when a correct key code is entered.

10. The portable theft deterrent device of claim 3, wherein the anchor comprises an electrical cable that is looped around a hard to move object and coupled between a first connector and a second connector in the lock detection mechanism.

11. The portable theft deterrent device of claim 1, wherein the lock detection mechanism includes a geometrical opening therethrough.

12. The portable theft deterrent device of claim 11, wherein the anchor comprises an electrical cable that is looped through the opening, is coupled to a first connector, looped around a hard to move object and coupled to a portable device.

13. The portable theft deterrent device of claim 3, wherein the anchor comprises an electrical cable that is connected between one of the plurality of connectors on the lock mechanism and an immovable power source.

14. The portable theft deterrent device of claim 3, wherein the anchor comprises a sensor which detects a change in position of the lock detection mechanism.

15. The portable theft deterrent device of claim 11, wherein the first active circuit includes a protection mechanism to detect tampering with the opening.

16. The portable theft deterrent device of claim 5, wherein the portable device includes any of a laptop, smartphone, tablet, phablet, digital camera, television, or recorders.

17. The portable theft deterrent device of claim 16, wherein the portable device includes one or more peripheral devices coupled thereto.

18. The portable theft deterrent device of claim 17, wherein the lock detection mechanism detects peripheral devices being attached or detached from the portable device.

19. The portable theft deterrent device of claim 1, wherein the monitoring key member includes a connector which can be utilized for any of data communication or power.

20. The portable theft deterrent device of claim 19, wherein the connector provides a charging path to an internal power source in the monitoring key member.

21. The portable theft deterrent device of claim 1, wherein wireless communication is utilized to secure the portable device by detecting an out of range condition of the portable device.

22. The portable theft deterrent device of claim 5, wherein a plurality of other portable devices are secured by being attached to the portable device.

23. The portable theft deterrent device of claim 1, wherein the lock detection mechanism and the monitoring key member exchange a communication key and a session key through the connectors.

24. The portable theft deterrent device of claim 1, wherein the lock detection mechanism and the monitoring key member exchange wireless communication alerting the user of a state or the environment of the portable device.

25. The portable theft deterrent device of claim 1, wherein the monitoring key is configured to terminate the lock detection mechanism by physical attachment thereto.

26. The portable theft deterrent device of claim 1 wherein the lock detection mechanism and the monitoring key member are configured to alert a user that the lock detection mechanism and the monitoring key member are outside of a predetermined range of each other.

27. The portable theft deterrent device of claim 1, wherein the monitoring key member is any of a smartphone, tablet, phablet, or laptop.

28. The portable theft deterrent device of claim 1, wherein the lock detection mechanism includes a memory, wherein the memory stores a record of information available including any tampering with the portable theft deterrent device.

29. The portable theft deterrent device of claim 1, wherein operation parameters from the portable theft deterrent device can be communicated to a device that is coupled to a network, wherein the network can be any of a public network or a private network.

30. The portable theft deterrent device of claim 1, wherein the lock detection mechanism includes a charging system.

* * * * *